United States Patent [19]

Strauss et al.

[11] Patent Number: 5,790,173
[45] Date of Patent: Aug. 4, 1998

[54] ADVANCED INTELLIGENT NETWORK HAVING DIGITAL ENTERTAINMENT TERMINAL OR THE LIKE INTERACTING WITH INTEGRATED SERVICE CONTROL POINT

[75] Inventors: Michael J. Strauss, Potomac, Md.; Robert D. Farris, Sterling, Va.

[73] Assignee: Bell Atlantic Network Services, Inc., Arlington, Va.

[21] Appl. No.: 504,305

[22] Filed: Jul. 20, 1995

[51] Int. Cl.⁶ .................. H04N 7/10; H04M 3/32; H04L 12/16

[52] U.S. Cl. .................. 348/7; 348/12; 370/259; 379/201

[58] Field of Search .................. 348/7, 10, 12, 348/13; 455/4.2, 5.1, 6.1, 6.2, 6.3; 379/112, 114, 15, 142, 201, 207; 370/259, 260

[56] References Cited

U.S. PATENT DOCUMENTS

| | | | |
|---|---|---|---|
| 4,150,254 | 4/1979 | Schussler et al. | 179/2 TV |
| 4,150,257 | 4/1979 | Fenton et al. | 179/18 BE |
| 4,232,199 | 11/1980 | Boatwright et al. | 179/18 B |
| 4,570,035 | 2/1986 | Pinede et al. | 179/99 |
| 4,605,825 | 8/1986 | Komuro et al. | 179/99 |
| 4,611,094 | 9/1986 | Asmuth et al. | 179/7.1 TP |
| 4,736,406 | 4/1988 | Molnar | 379/94 |
| 4,751,578 | 6/1988 | Reiter et al. | 358/183 |
| 4,763,191 | 8/1988 | Gordon et al. | 358/86 |
| 4,763,353 | 8/1988 | Canale et al. | 379/157 |
| 4,788,720 | 11/1988 | Brennan et al. | 379/201 |
| 4,866,758 | 9/1989 | Heinzelmann | 379/94 |
| 4,866,763 | 9/1989 | Cooper et al. | 379/221 |
| 4,890,321 | 12/1989 | Seth-Smith et al. | 380/20 |
| 4,890,322 | 12/1989 | Russell, Jr. | 380/20 |
| 4,893,326 | 1/1990 | Duran et al. | 379/53 |
| 4,897,866 | 1/1990 | Majmudar et al. | 379/94 |
| 4,905,274 | 2/1990 | Cooper et al. | 379/157 |
| 4,959,854 | 9/1990 | Cave et al. | 379/157 |
| 5,241,588 | 8/1993 | Babson, III et al. | 379/201 |
| 5,247,347 | 9/1993 | Litteral et al. | 358/85 |
| 5,247,571 | 9/1993 | Kay et al. | 379/207 |
| 5,278,889 | 1/1994 | Papanicolaou et al. | 379/53 |
| 5,327,554 | 7/1994 | Palazzi, III et al. | 395/600 |
| 5,329,308 | 7/1994 | Binns et al. | 348/14 |
| 5,473,679 | 12/1995 | La Porta et al. | 379/201 |
| 5,574,779 | 11/1996 | Ely et al. | 379/207 |
| 5,583,920 | 12/1996 | Wheeler | 379/88 |
| 5,629,978 | 5/1997 | Blumhardt et al. | 379/201 |

*Primary Examiner*—Mark R. Powell
*Assistant Examiner*—Ronald D. House
*Attorney, Agent, or Firm*—McDermott, Will & Emery

[57] ABSTRACT

A digital entertainment terminal, such as a set top box, is used as a subscriber interface in the Advanced Intelligent Network (AIN). The digital entertainment terminal interacts with the Integrated Service Control Point (ISCP) and central office switches to permit a customer to customize features of their telephone services such as voice announcement, digit collection, speech recognition capabilities and an array of other enhanced call processing features, such as voice or facsimile messaging. The digital entertainment terminal is preferably a set top box used for video-on-demand and similar services modified to provide dial-up communication with the ISCP of the AIN.

32 Claims, 9 Drawing Sheets

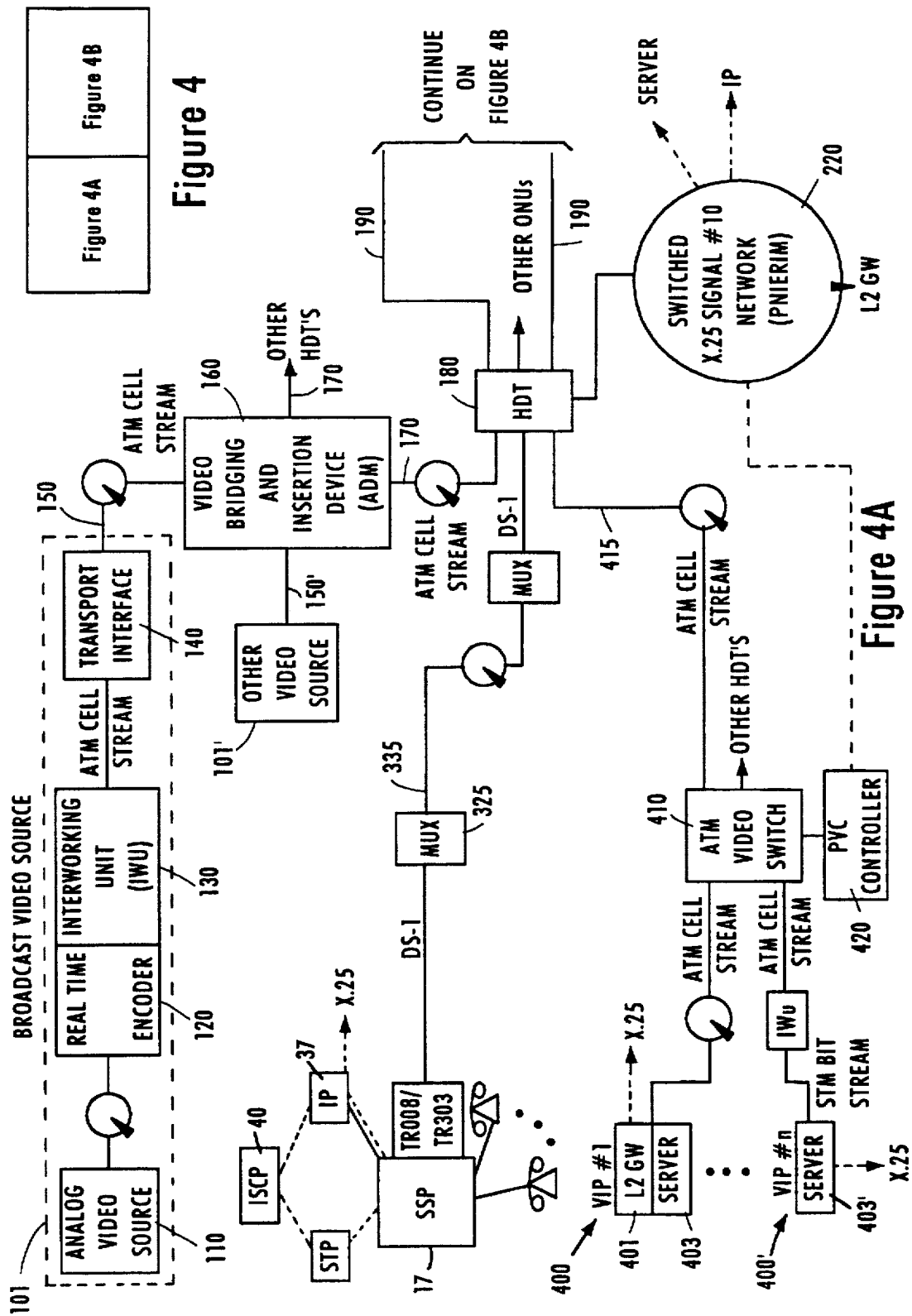

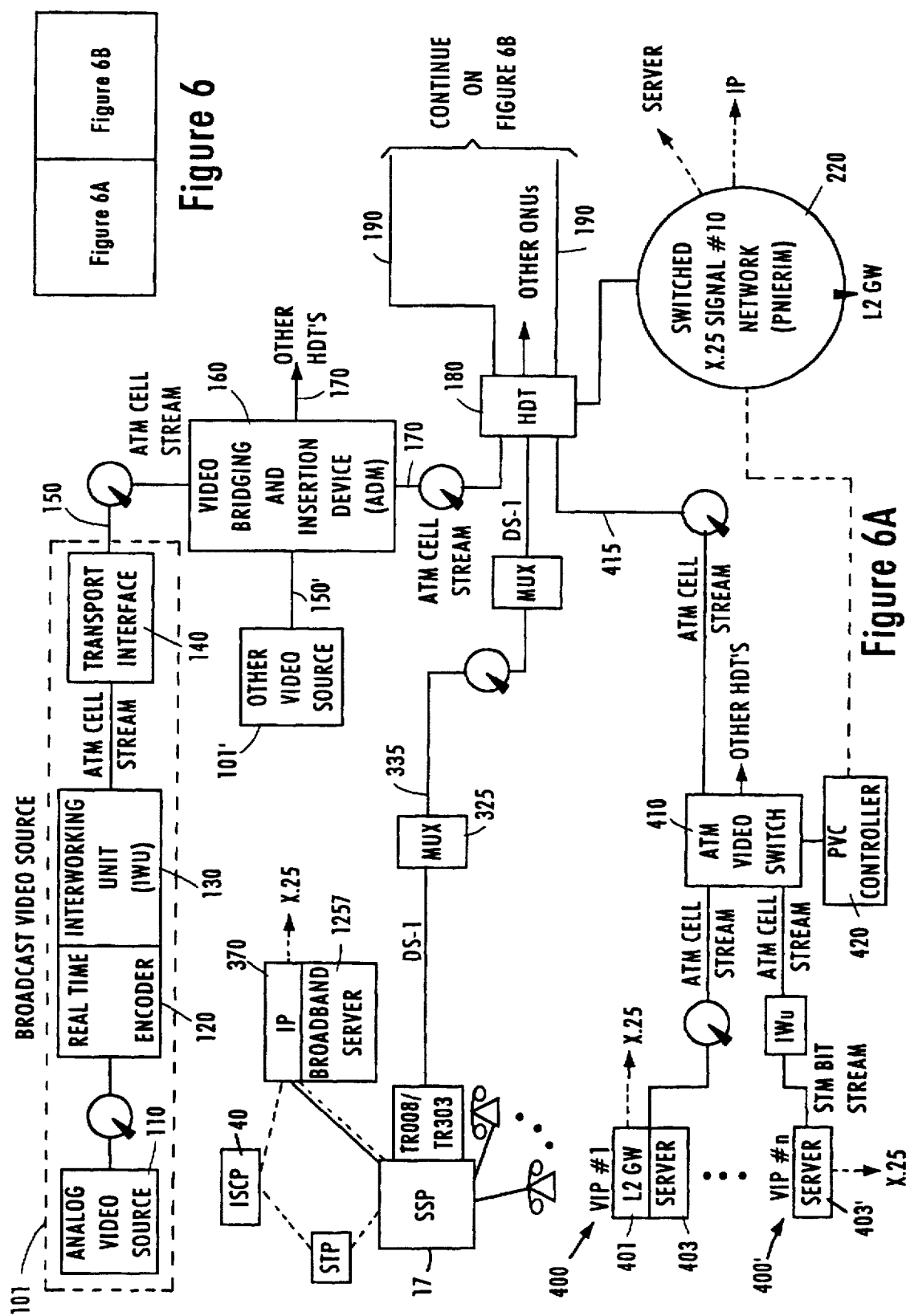

ADVANCED INTELLIGENT NETWORK HAVING DIGITAL ENTERTAINMENT TERMINAL OR THE LIKE INTERACTING WITH INTEGRATED SERVICE CONTROL POINT

TECHNICAL FIELD OF THE INVENTION

The present invention relates to an Advanced Intelligent Network having a network switching system controlled by a programmable centralized database, and more particularly, to such a system that is programmable from remote subscriber terminals.

ACRONYMS

The written description uses a large number of acronyms to refer to various services and system components. Although generally known, use of several of these acronyms is not strictly standardized in the art. For purposes of this discussion, acronyms therefore will be defined as follows:
Advanced Intelligent Network (AIN)
Assymetrical Digital Subscriber Line (ADSL)
Central Office (CO)
Common Channel Inter-office Signalling (CCIS)
Customer Premises Equipment (CPE)
Customized Call Processing Information (CCPI)
Data and Reporting System (DRS)
Digital Entertainment Terminal (DET)
Integrated Service Control Point (ISCP)
Integrated Services Digital Network (ISDN)
Intelligent Peripheral (IP)
Maintenance and Operations Center (MOC)
Multi-Services Application Platform (MSAP)
Plain Old Telephone Service (POTS)
Service Control Point (SCP)
Service Creation Environment (SCE)
Service Management System (SMS)
Service Switching Point (SSP)
Signaling Transfer Point (STP)
Simplified Message Desk Interface (SMDI)
Transaction Capabilities Applications Protocol (TCAP)

BACKGROUND OF THE RELATED ART

In recent years, a number of new service features have been provided by an enhanced telephone network, sometimes referred to as an Advanced Intelligent Network (AIN). In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel interoffice signalling (CCIS) link to an Integrated Service Control Point (ISCP) which includes a Multi-Services Application Platform (MSAP) database. The ISCP is essentially a central control for the network. If needed, it can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call.

An AIN type network was disclosed and described in detail in commonly assigned U.S. Pat. No. 5,247,571 to Kay et al, the entire disclosure of which is incorporated herein by reference. In AIN type systems such as disclosed in the Kay et al patent, announcement and digit functions may be required for certain specific services. For example, a caller may be prompted by a tone or speech announcement to enter a personal identification number (PIN) before obtaining a selected service or modifying certain stored parameters relating to the subscriber's AIN service. Nodes are usually added to the telephone network, separate from the switching office, to provide the announcements and related enhanced service features.

Concurrent with the recent developments in advanced intelligent networks, several different wideband digital distribution networks have been proposed for offering subscribers an array of video services, including true Video On Demand service. For example, U.S. Pat. No. 5,247,347 to Litteral et al, which is hereby entirely incorporated by reference, discusses a digital video distribution network providing subscribers with access to multiple service providers through the public switched telephone network.

These digital distribution networks have evolved to provide equal access to multiple service providers and a video "dial tone" functionality somewhat analogous to the dial tone call-up functionality available through the telephone network. FIG. 7 is a block diagram of one type of broadband network for providing interactive services, such as video on demand, home shopping or purchasing, home banking, medical information, ticket ordering, gaming, etc. from a plurality of service providers.

In the network shown in FIG. 7, the customer premises equipment (CPE) consists of a set top terminal type Digital Entertainment Terminal (DET) 700 and a telephone (POTS or ISDN). The connections to the network utilize Asymmetrical Digital Subscriber Line (ADSL) frequency division multiplexing technology, typically over twisted wire pair. The ADSL connection provides a 1.5 Mb/s downstream video information channel, a two-way telephone connection and a two-way 16 kbit/s control channel. The ADSL technology is described in more detail in the Litteral et al Patent. The Video Dial Tone network architecture may use some form of fiber extension in the actual subscriber loops, to provide services to subscribers located more than 1.5 kilofeet from a central office. In the illustrated network, the drop to the subscriber's premises is always a wired ADSL loop.

In the network of FIG. 7, the DET 700 connects to an ADSL multiplexer/demultiplexer 701 similar to the in-home ADSL unit in the above discussed Litteral et al patent. Each ADSL subscriber line 703 will connect to an ADSL bay 705 located in or associated with the subscriber's local telephone company central office. For each subscriber line 703, the ADSL bay 705 includes an ADSL multiplexer/demultiplexer similar to the central office ADSL unit in the above discussed Litteral et al. Patent.

The ADSL bay 705 provides transport for voice signals on the subscriber loop to and from the associated voice switch 707. The ADSL bay 705 also connects to an access concentrator 709 for providing two-way signaling connections through an X.25 type packet switched data network 711. The ADSL bay 705 also receives broadband digital signals for downstream transport over the ADSL line 703 to each subscriber's premises from a digital cross connect switch 713, labelled "Access DCS" in the drawing. One ADSL line to the home carries one channel of video programming and provides a single output channel. The output channel can provide a video signal to a VCR or to the TV set 700'. The various Access DCS switches throughout the network are controlled by switch controller 712.

If the ADSL bay 705 is local, i.e. located in the same telephone company central office as the cross connect switch DCS 713, the ADSL bay 705 connects to the Access DCS 713 via an appropriate number of local DS1 connections 715. In service areas where an ADSL bay does not carry enough traffic to warrant an associated Access DCS, the ADSL bay will be located in a remote central office facility. Such a remote ADSL bay connects to the Access DCS 713 via a SONET type optical fiber link 717 providing an appropriate number of multiplexed channels to service the number of subscribers connected to the particular ADSL bay.

The Access DCS 713 provides both point-to-point connections and point-to-multipoint connections. Individualized interactive services, such as Video On Demand, home shopping/purchasing and banking, use point-to-point connections wherein the Access DCS connects one broadband input port from a VIP's server to one output port going to the subscriber's ADSL line. Narrowcast and broadcast services utilize point-to-multi-point connections of one input port to a plurality of output ports.

The illustrated architecture of the Video Dial Tone network utilizes two levels of gateways, both of which will communicate with subscribers' DET's via the X.25 data network 711 and the signaling channel on the ADSL subscriber loops 703.

The level 1 gateway 721 performs a variety of network connectivity related functions, including communications port management of transmissions of information between subscribers and servers, processing of billing information and session management. Normally, each subscriber accesses the level 1 gateway (e.g. to select and access a particular VIP's server) by operation of a remote control device which causes the subscriber's DET 700 to transmit data signals to the level 1 gateway via the 16 Kb/s control channel and the X.25 packet switched data network 711. The level 1 gateway transmits one or more selection menus to the subscriber's DET 700 as screens of text data carried by the same path back through the network.

A level 2 gateway provides a number of services for the Information Providers. These services include transmission of menus of available information to subscribers, searches of available information, targeted advertisement insertion, previews, trailers, etc. The level 2 gateway will download video or audio menus to each subscriber's DET for display, thereby allowing each subscriber to select desired information. Once a subscriber makes a selection, the level 2 gateway will signal the appropriate server to schedule transmission of the selected information through the established downstream video transmission path.

The Video Dial Tone network of FIG. 7 provides video on demand and closely related interactive multimedia services. For example, using the upstream data channel, the subscriber can send a request for a particular movie, and the VIP's server will retrieve and transmit that movie as an MPEG digital data stream on the 1.5 Mb/s downstream channel to the digital audio/video processor in the subscriber's DET 700. The DET converts the digital data stream to a signal for driving a standard television set for real time viewing of the movie by the subscriber.

The services are set up by delivering a message over the 16 kbit/s signaling channel on the ADSL subscriber's line. The access concentrator 709 uses the X.121 address of the level 1 gateway 721 and the X.121 address associated with the calling subscriber's line 703 to initiate an X.25 packet data call to the level 1 gateway 721. As part of this call, the access concentrator 709 packetizes each message from the DET 700 and adds header information to facilitate transport through an assigned virtual circuit through the X.25 network 711 to the gateway 721.

As part of the X.25 call set up procedure, the access concentrator 709 identified the subscriber and included an X.121 address for the X.25 network port assigned to the subscriber in the initial signaling packet sent through the X.25 network. The level 1 gateway 721 receiving X.25 packets of DET signaling data therefore knows the X.121 address of the calling subscriber. The level 1 gateway 721 uses that information together with the VIP selection input to initiate an X.25 data call to the VIP's level 2 gateway to ask if the subscriber is a valid customer of the particular VIP. If the level 2 gateway indicates that the subscriber is valid, the level 1 gateway 721 initiates a call through switch controller 712 to instruct the appropriate digital cross connect switch DCS 713 to set up a downstream broadband link from the VIP's file server to the subscriber's DET 700 and drops the X.25 communication link to the DET. At approximately the same time, the VIP's level 2 gateway initiates an X.25 packet data call to the subscriber's DET 700. Completion of set-up of both the broadband link and the X.25 signalling link to the DET establishes an interactive video session between the VIP's gateway and server system 752 and the subscriber's DET 700.

Once a session is established, the level 2 gateway executes a two-way communication with the DET 700 through the X.25 network 711 and the signaling channel to obtain a selection or other relevant input from the subscriber. In response, the level 2 gateway provides a signal to the associated file server instructing the server to initiate transmission of selected audio/video program materials from memory through the output port which the DCS 713 has currently connected to the subscriber's line 703. The connection through the DCS routes the downstream broadband transmission to the ADSL bay 705, and within that bay, to the ADSL multiplexer/demultiplexer serving the subscriber's line for transmission over the line 703. The ADSL multiplexer/demultiplexer 701 demultiplexes the broadband signal carrying MPEG encoded audio/video material and applies that signal to the subscriber's DET 700 for decoding and display on the television set 700'.

A more detailed description of the network of FIG. 7, with particular emphasis on the network control functionality of the level 1 gateway, appears in commonly assigned U.S. patent application Ser. No. 08/374,104 filed on Sep. 12, 1994 entitled "LEVEL 1 GATEWAY FOR VIDEO DIAL TONE NETWORKS" (attorney docket no. 680-093), the disclosure of which is incorporated herein in its entirety by reference.

Although the final drop into the subscriber's home is over telephone lines shared between telephone service and video service, the prior art makes little use of the additional video capabilities of the existing telephone network. AIN services are generally developed and added through interaction with the ISCP by telephone company personnel at the CO-side of the network. Typically, a subscriber must call a computer operator at the telephone company who has a direct link to the ISCP and who initiates or changes AIN services on behalf of the requesting subscriber. Such a system fails to take advantage of the dial-up capabilities provided by the video dial tone network.

Also, while the video service discussed above is intended to be interactive, the upstream control signals generally are directed to the VIP and relate only to the manner in which the video signals are delivered. The control signals generally are not related to telephone services or to the routing of telephone calls in conjunction with video services.

To date, the AIN telephone network has been a separate technical area of development, with at most limited interaction between the AIN and the digital video distribution networks. For example, U.S. Pat. No. 4,763,191 to Gordon et al discusses a method for providing a nationwide dial-a-view service in which a caller desiring a given viewing selection dials an INWATS "800" dial-a-view number for ordering that selection through the telephone networking arrangement. A central data base system provides the originating toll office with routing instructions for sending the request to network services equipment. The network services equipment acknowledges the caller's request for cable services and processes the dial-a-view request. The network services equipment provides relevant data to cable television distribution equipment to control actual supply of requested programming to the calling subscriber. Separate vendor equipment supplies the requested programming to the calling customer via activation of an addressable decoder at the calling customer's television. The telephone network components still do not directly control actual routing of program materials through the broadband network.

As another example, U.S. Pat. No. 5,278,889 to Papanicolaou et al discusses a two-way video telephone system using a combination of a two-way cable television distribution system and an intelligent voice telephone network. The video distribution networks used apparently are existing frequency division multiplexed analog transmission systems. As part of the disclosed call processing, a central database responds to video telephone call dialing information by providing instructions to the network to route the video portion of the call through a digital inter-exchange carrier network between points of presence of two of the cable television distribution networks.

As AIN services become more prevalent and sophisticated, it has also become desireable to create individual customized services, such as announcements and call routing, for each customer. U.S. Pat. No. 4,611,094 to Asmuth et al discusses a method and apparatus for implementing customized service procedures for individual customers of a telephone network using an off-line computer system. However, the system in Asmuth et al disadvantageously required a computer programmer to write program sequences to define the customized service.

U.S. Pat. No. 5,241,588 to Babson et al discusses an improved method for the creation and execution of customized call processing information (CCPI) records to provide the desired service. The CCPI records are created by an operator at a display terminal to provide a visual representation of the desired service. The displayed service is translated into a binary representation and executed in a call processing environment to process calls to or from a phone number identified by the customer, in accordance with the customer's desires. Thus, each individual customer can design and have implemented unique telephone services.

The method provides services for individual customers of a telephone network in response to customer requests through the following steps (executed by a data processor): Storing a plurality of customer service procedures, each of the customer service procedures corresponding to a different one of the customers of the network; receiving requests for custom customer services; determining the custom customer service procedures corresponding to the received requests; retrieving from a customized procedure storage means the custom customer service procedures corresponding to each of the requests, and executing the retrieved service procedures to provide services for the customers. The patent also has an alternate method for executing a procedure that involves testing conditions requested by the customer and taking action in accordance with the results of the test.

The patent has a plethora of figures illustrating the various computer screen displays. FIG. 33 of the patent illustrates a flow diagram of the operation of a service creation portion to create a new graph. FIGS. 52 to 62 are flow diagrams of the various other operations that provide for service creations.

Babson discusses a customized service (CS) application to create and, in certain circumstances, execute each customer's service procedure or program. Each customer's service program is stored as a record or a series of records of customized call processing information (CCPI) in a database. The CS application includes a programming interface with permits an operator to use the CS application to create various user interfaces to obtain information, directly or indirectly, in a manner which is relatively easy to use. The information is used to generate the CCPI records automatically.

The hardware of the system is depicted in FIG. 3 and described in Column 9, lines 20–44. The architecture of the software is described in Section B, beginning in Column 10, line 47.

However, the Asmuth et al and Babson et al patents only offer a limited number of telephone services and do not disclose customization which includes the option of combining certain telephone services with non-telephone services. For example, the patents do not disclose a customized telephone service in which telephone calls are blocked during a pay-per-view event.

Furthermore, the customized telephone service is not directly created by a subscriber. Instead, a subscriber usually customizes their service in a two-step process. In the first step the subscriber calls the telephone company and verbally indicates the desired telephone services to a telephone company employee. The subscriber's service is then subsequently set up or modified by a telephone company technician using a computer in a Service Creation Environment (SCE) which is within the ISCP on the company's premises and separate from the subscriber telephone lines of the network. Consequently, the customized telephone service is not requested or created at the telephone line at which the service is to be applied.

This process is believed to be unnecesarily expensive and to cause delay since the subscriber may have to wait to speak to a person at the telephone company who will receive the verbal request for customized telephone service. There may also be another delay before the request is entered. These delay mays deter some subscribers from requesting customized telephone services. Human errors may also be introduced in either one of the steps. For example, the subscriber's verbal request may not be understood correctly over the telephone or the service may not be correctly input into the computer.

SUMMARY OF THE INVENTION

It is an object of the present invention to permit a customized service record to be directly requested and created by the customer over the telephone line at which the service is to be applied.

It is also an object of the present invention to more closely integrate elements of the AIN telephone network and the network providing video communications, particularly for purposes of controlling routing of telephone services in conjunction with the distribution of video, video-on-demand, pay per view and ADSL communications over the dial tone network.

It is a further object of the present invention to provide a telephone network which offers customization of telephone services, enhanced capabilities and other service features, through interactions with the central database, which take into consideration non-telephone services such as video-on-demand or ADSL communications.

The invention is based upon a realization that numerous advantages would be gained by more closely integrating elements of the AIN telephone network and the video network, particularly for purposes of controlling routing of telephone services in conjunction with the distribution of video, video-on-demand, pay per view and ADSL communications over a dial tone network. In particular, it is desired that the telephone network offer dial-up customization of AIN services, enhanced capabilities and other service features, through interactions with the central database, including services unique to video services such as video-on-demand or ADSL communications.

To achieve these advantages, the invention employs a programmable digital entertainment terminal (DET) to interface with the ISCP and one or more switching systems of an AIN network and to provide for the display of high level graphical interfaces for creating customised service records on the VOD television screen. The telephone customer interacts with the DET directly, indicating the desired changes to their telephone service, and the DET then automatically communicates with the ISCP and causes changes to be made to the data in the ISCP according to the selections made by the customer, thus permitting the customer to create their own desired telephone service. The DET is also used by the telephone customer to input information to be used in a customized service such as, for example, the phone number that telephone calls are to be routed to in a call forwarding service.

In a preferred embodiment of the invention, the DET is a set top box of the type used in cable television or video-on-demand services connected to a television set. Furthermore, the customised telephone service created using the set top box may include functions which are uniquely advantageous when implemented during the cable television or video-on-demand services provided by the set top box or which are only implemented during the cable television or video-on-demand services provided by the set top box. For example, the customized telephone service may block calls during the cable television or video-on-demand services.

Alternatively, the DET may be a general purpose computer, or connected to a general purpose computer, with appropriate line interfaces running software offering the ability to request customized telephone service as well as a number of other different enhanced service features, such as voice mail, facsimile mail, etc.

The ability of the DET to provide a user interface and to collect input information, as either service selections or dialed digits (e.g. DTMF inputs), also provides an automated service platform for input of new service information or modified service information, directly from subscribers. For example, when a subscriber calls in to change service information, the DET executes a script to obtain the change information, in a manner quite similar to call routing operations in AIN networks. After all necessary service change information has been received, the DET forwards the information to the ISCP and disconnects the call.

The DET preferably interfaces with the ISCP over a dial-up connection through the existing telephone communication network, although it may also interface over a signalling communication system separate from the telephone communication network.

In any implementation, the present invention addresses the disadvantages in the prior art by utilizing a digital entertainment terminal to perform a variety of functions relating to the provisioning of telephone service, in addition to video signal processing and other functions. The invention also advantageously integrates AIN services and video services in a cost-efficient manner at the subscriber's location and improves call routing and switching efficiency through the video dial tone network by altering telephone call switching during a complete interactive video session through the integrated network.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENTS

Figure 1:
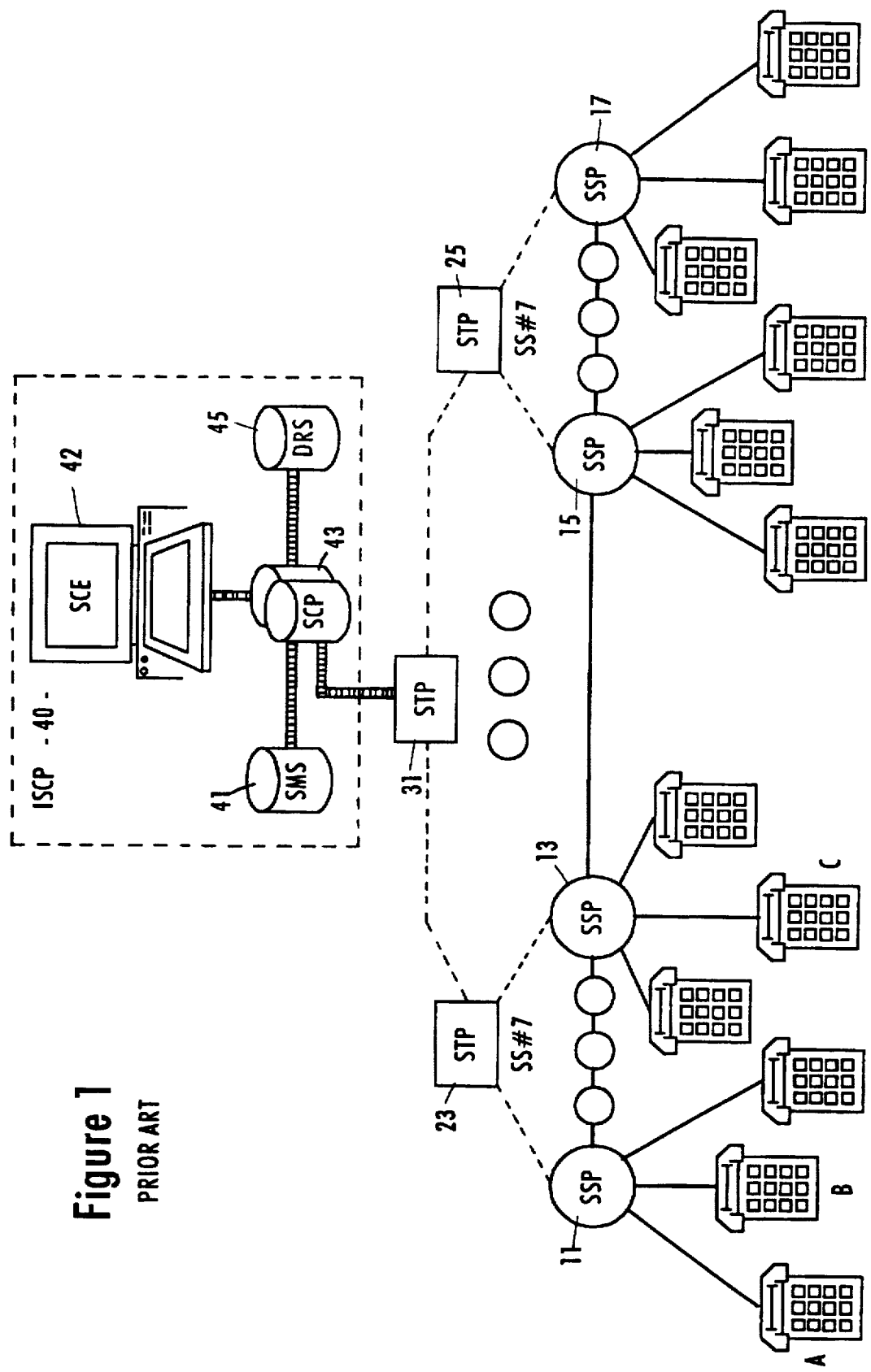
FIG. 1 is a schematic block diagram of a conventional Advanced Intelligent Network architecture.

FIG. 1 is a schematic block diagram of the components of a conventional AIN. In this figure, each of the CO's are labeled as an "SSP." The Service Switching Points, referred to as SSP's, are appropriately equipped programmable switches present in the telephone network, which recognize AIN type calls, launch queries to the ISCP and receive commands and data from the ISCP to further process the AIN calls. In FIG. 1, the COSSP's are end offices.

SSP's can be programmed to recognize a number of different triggers as an indication that a call is an AIN call. The trigger can relate to the terminating station, but is typically the identification of the telephone line from which a call or other request for service originates. Generally, a number of lines are designated as members of a business group serviced by an Area Wide Centrex. The SSP's then trigger AIN type servicing based on origination of the call or service request from a line subscribing to the service.

As shown in FIG. 1, all of the CO's 11, 13, 15 and 17 are equipped and programmed to serve as SSP's. The illustrated embodiment is perhaps an ideal implementation which would make a variety of Advance Intelligent Network AIN services widely available at the local office level throughout the network. Other AIN implementations provide the SSP functionality only at selected points in the network, and end offices without such functionality forward calls to one of the SSP's.

Such central office switching systems typically consist of a programmable digital switch with CCIS communications capabilities. One example of a SSP capable switch is a 5ESS type switch manufactured by AT&T; but other vendors, such as Northern Telecom and Seimens, manufacture comparable digital switches which could serve as the SSP's. The structure of an exemplary CO which may serve as the SSP type CO's in the system of FIG. 1 will be discussed in more detail below, with regard to FIG. 2.

The SSP's 11 and 13 connect to a first local area STP 23, and the SSP's 15 and 17 connect to a second local area STP 25. The connections to the STP's are for signalling purposes. As indicated by the black dots below STP's 23 and 25, each local area STP can connect to a large number of the SSP's. Although not shown, the central offices or SSP's are interconnected to each other by trunk circuits for carrying telephone services.

The local area STP's 23 and 25, and any number of other such local area STP's shown as black dots between STP's 23 and 25 communicate with a state or regional STP 31. The state or regional STP 31 in turn provides communications with the ISCP 40. The STP hierarchy can be expanded or contracted to as many levels as needed to serve any size area covered by the Area Wide Centrex and to service any number of stations and central office switches. Also, certain switching offices within the network, whether SSP's or not, may function primarily as tandem type offices providing connections between trunk circuits only. The links 23 and 25 between the CO'S and the local area STP's are dedicated CCIS links, typically SS#7 type interoffice data communication channels. The local area STP's are in turn connected to each other and to the regional STP 31 via a packet switched network. The regional STP 31 also communicates with the ISCP 40 via a packet switched network.

The above described data signalling network between the SSP type central offices and the ISCP is preferred, but other signalling networks could be used. For example, instead of the CCIS links, STP's and packet networks, a number of central office switches and an ISCP could be linked for data communication by a token ring network. Also, the SSP capability may not always be available at the local office level, and several other implementations might be used to provide the requisite SSP capability, as will be discussed in more detail later.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node.

There could be one or more ISCP's per state, to avoid overloading existing CCIS data links. Alternatively, the ISCP could be implemented on a LATA by LATA basis or on a regional operating company basis, i.e. one database for the entire geographic area serviced by one of the Regional Bell Operating Companies. In fact, if federal regulations permitted, the database service could become nationwide.

As shown in FIG. 1, the ISCP 40 is an integrated system. Among other system components, the ISCP 40 includes a Service Management System (SMS) 41, a Data and Reporting System (DRS) 45 and the actual data base or Service Control Point (SCP) 43. The ISCP also typically includes a terminal subsystem referred to as a Service Creation Environment or SCE (not shown) for programming the data base in the SCP 43 for the services subscribed to by each individual business customer. The components of the ISCP are connected by an internal, high-speed data network, such as a token ring network (not shown).

Conventionally, a subscriber's individual service is set up and modified by a telephone company technician using the Service Creation Environment or SCE 42 in the ISCP 40. As part of this procedure, the technician establishes one or more data tables for the subscriber in the SCP 43. The format of the data tables would be defined by the types of data needed to control the service in the manner selected by the particular subscriber. Any control data which the subscriber wants to apply as fixed data to all calls would be input by the technician using the SCE 42.

Although shown as telephones, the terminals in FIG. 1 can comprise any communication device compatible with the line. Where the line is a standard voice grade telephone line, for example, the terminals could include facsimile devices, modems etc.

Figure 2:
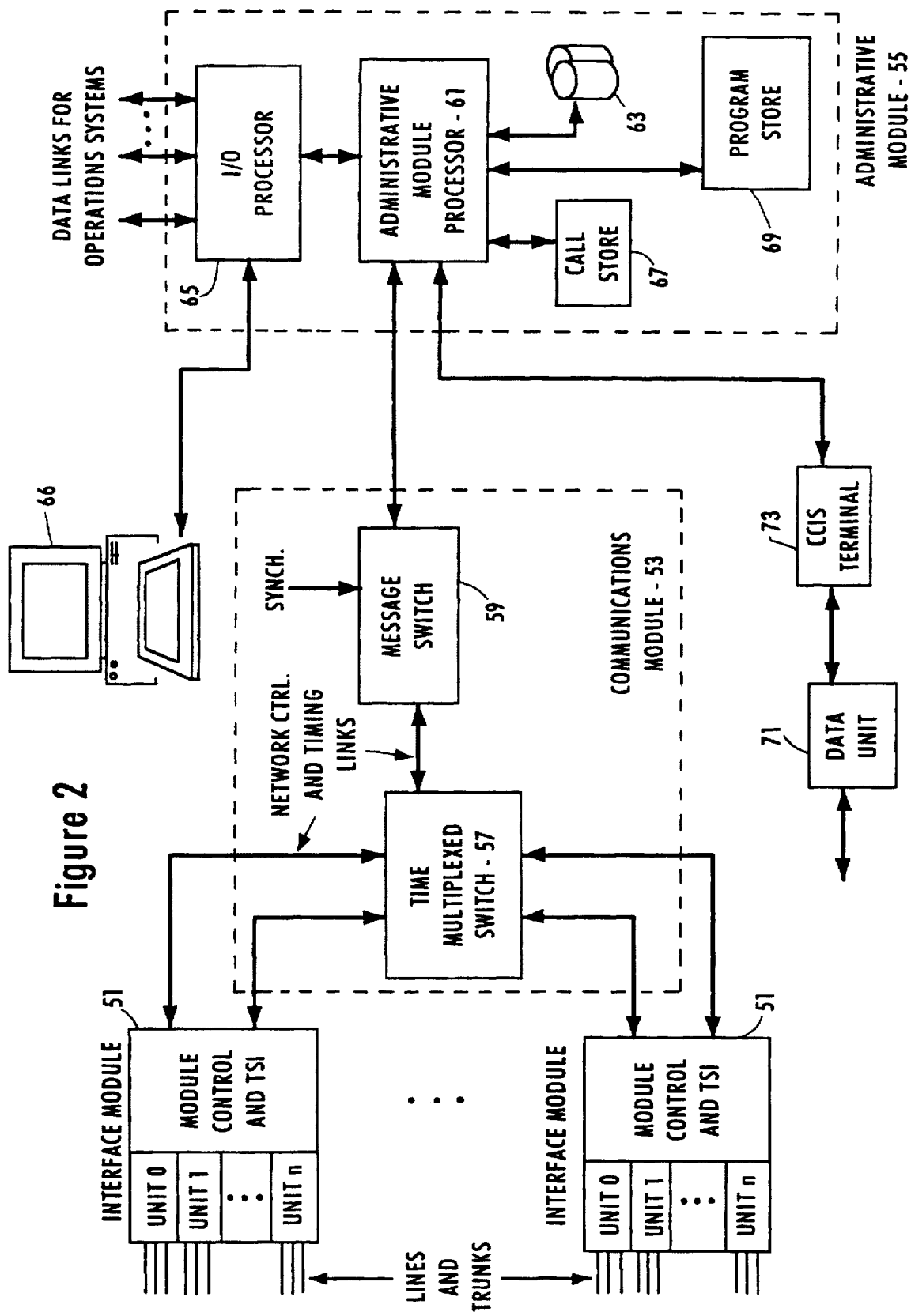
FIG. 2 is a more detailed diagram of one of the SSP type central offices used in FIG. 1.

FIG. 2 is a simplified block diagram of an electronic program controlled switch which may be used as any one of the SSP type CO's in the system of FIG. 1. As illustrated, the CO switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 includes an administrative module processor 61, which is a computer equipped with disc storage 63, for overall control of CO operations. The administrative module processor 61 communicates with the interface modules 51 through the communication module 55. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signalling link between the administrative module processor 61 and an SS#7 network connection to an STP or the like (see FIG. 1), for facilitating call processing signal communications with other CO's and with the ISCP 40.

As illustrated in FIG. 2, the administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disc storage 63 together with routing information and any temporary information needed for processing the call. For example, for a switch based Centrex type service, the call store 67 would receive and store extension number translation information for the business customer corresponding to an off-hook line initiating a call. The program store 69 stores program instructions which direct operations of the computer serving as the administrative module processor.

A central office switching system or CO shown in FIG. 1 normally responds to a service request on a local communication line connected thereto, for example an off-hook followed by dialed digit information, to selectively connect the requesting line to another selected local communication line. The connection can be made locally through only the connected central office switching system. For example, for a call from station A to station B the SSP-CO 11 provides the call connection without any connection to another central office. When the called line connects to a distant station, for example when station A calls station C, the connection is made through the connected central office switching system SSP-CO 11 and at least one other central office switching system SSP-CO 13 through the telephone trunks interconnecting the two central office switches.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signalling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the local central office (CO) suspends the call and sends a query message through one or more of the STP's. The query message goes to the central office to which the called station is connected, referred to as the "terminating" central office; for example, for a call from station A to station C the query would go from originating SSP-CO 11 to terminating SSP-CO 13. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices (and/or tandem offices) of the network between the calling and called stations. The receiving central office then provides a ringing signal to the called station and sends ringback tone back through the connection to the calling station.

The call processing routines discussed above are similar to those used in existing networks to complete calls between stations. In an AIN type network with peripheral platforms, these normal call processing routines would still be executed for completion of calls not requiring AIN processing or service features provided by the peripheral platform.

In an Advanced Intelligent Network (AIN) type system, such as shown in FIG. 1, certain calls receive specialized AIN type processing under control of data files stored in the SCP database 43 within the ISCP 40. In such a network, the SSP type local offices of the public telephone network include appropriate data in the translation tables for customers subscribing to AIN services to define certain call processing events identified as AIN "triggers". Using the translation table data from disc memory 63, the SSP will detect such triggering events during processing of calls to or from such AIN service subscribers.

The SSP type switches can recognize a variety of events as triggers for activating a query and response type AIN interaction with the ISCP. A number of different AIN triggers are used, depending on the precise type of service the AIN will provide a particular subscriber. For example, if a subscriber has a speech responsive autodialing service, an off-hook immediate trigger might be stored in the translation table file for that subscriber in the SSP. The SSP would detect the trigger each time the subscriber goes off-hook on that line and then attempt to obtain further instructions from the ISCP.

For ordinary telephone service calls, there would be no event to trigger AIN processing; and the local and toll office switches would function normally and process such calls as discussed above, without referring to the SCP database for instructions. In a first mode of operation, an SSP type office (CO or tandem) which detects a trigger will suspend call processing, compile a TCAP formatted call data message and forward that message via a common channel interoffice signalling (CCIS) link and STP(s) to the ISCP 40 which includes the SCP database 43. The ISCP accesses its stored data tables to translate the received message data into a call control message and returns the call control message to the office of the network via CCIS link and STP(s). The SSP then uses the call control message to complete the particular call through the network. For AIN calls requiring a processing feature provided by a peripheral platform, the call control message would instruct the SSP to route the call to the associated peripheral platform.

In the network of FIG. 1, the ISCP 40 transmits a "SEND to RESOURCE" type TCAP message instructing an SSP, such as SSP 17, to access a resource and collect digits. This message identifies a particular resource, in this case an ISDN type voice channel to an associated peripheral announcement platform. Each time the ISCP sends such a "SEND to RESOURCE" message to an SSP, the ISCP concurrently sends a message through the X.25 data link to the associated peripheral announcement platform. This message tells the platform what message to play on the specified ISDN channel at that time. If the message announcement platform has a text-to-speech converter, the announcement could take the form of virtually any desired script.

Figure 3:
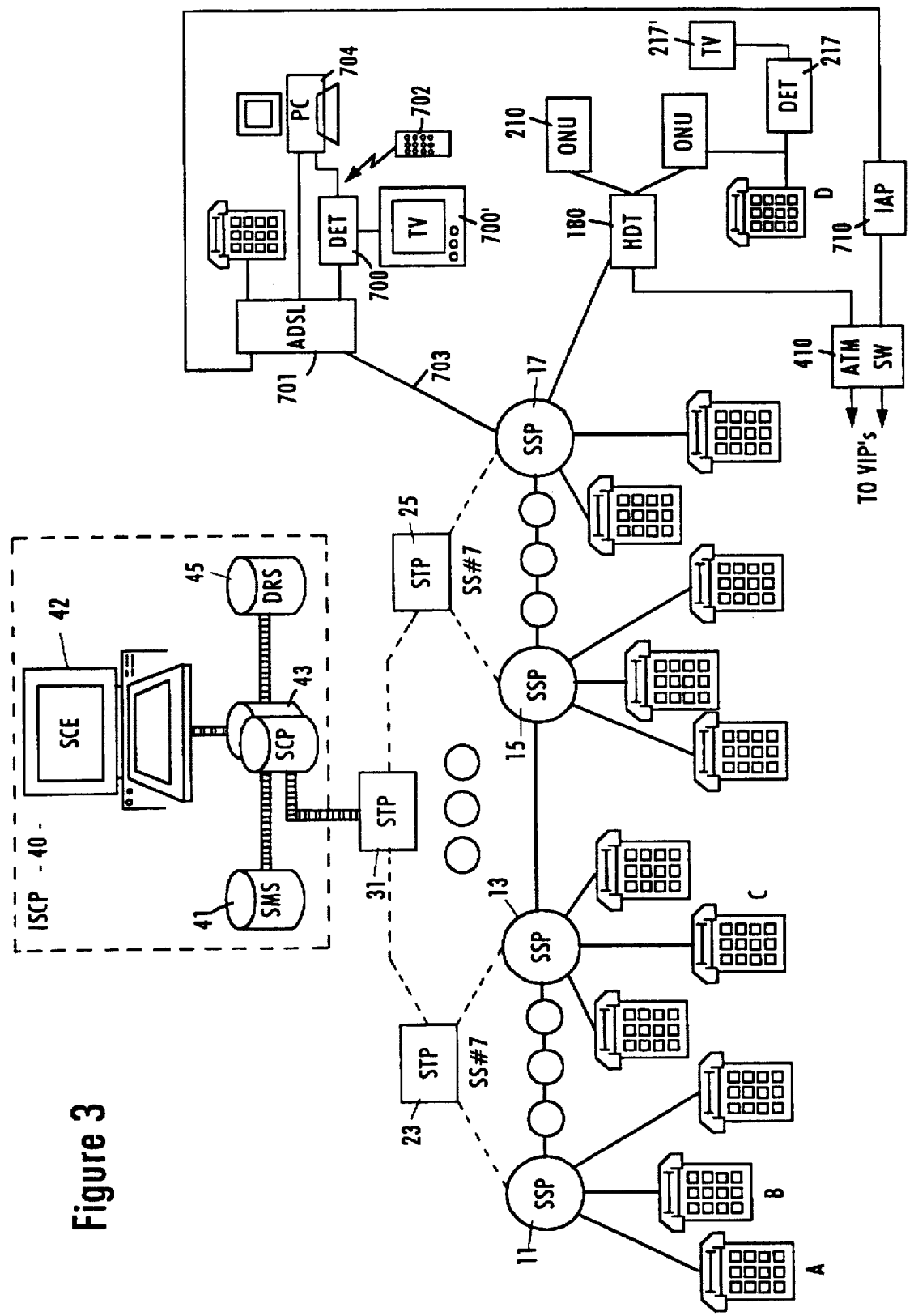
FIG. 3 is a schematic block diagram of an Advanced Intelligent Network architecture showing alternative implementations of DETs for customizing telephone service at a number of subscriber locations.

FIG. 3 shows an AIN network essentially similar to that of FIG. 1, containing two implementations of a DET at a subscriber's premises for customizing telephone service. Both implementations receive ATM broadband signals from an ATM switch 410 and from other sources such as broadcast or CATV ATM sources or servers and receive telephone services through SSP type CO 17. Although not shown, the invention could also be practiced in a hybrid fiber coax network using radio frequency transport of digitized, compressed video signals as in U.S. patent application Ser. No. 08/304,174 (680-093) noted earlier.

Figure 7:
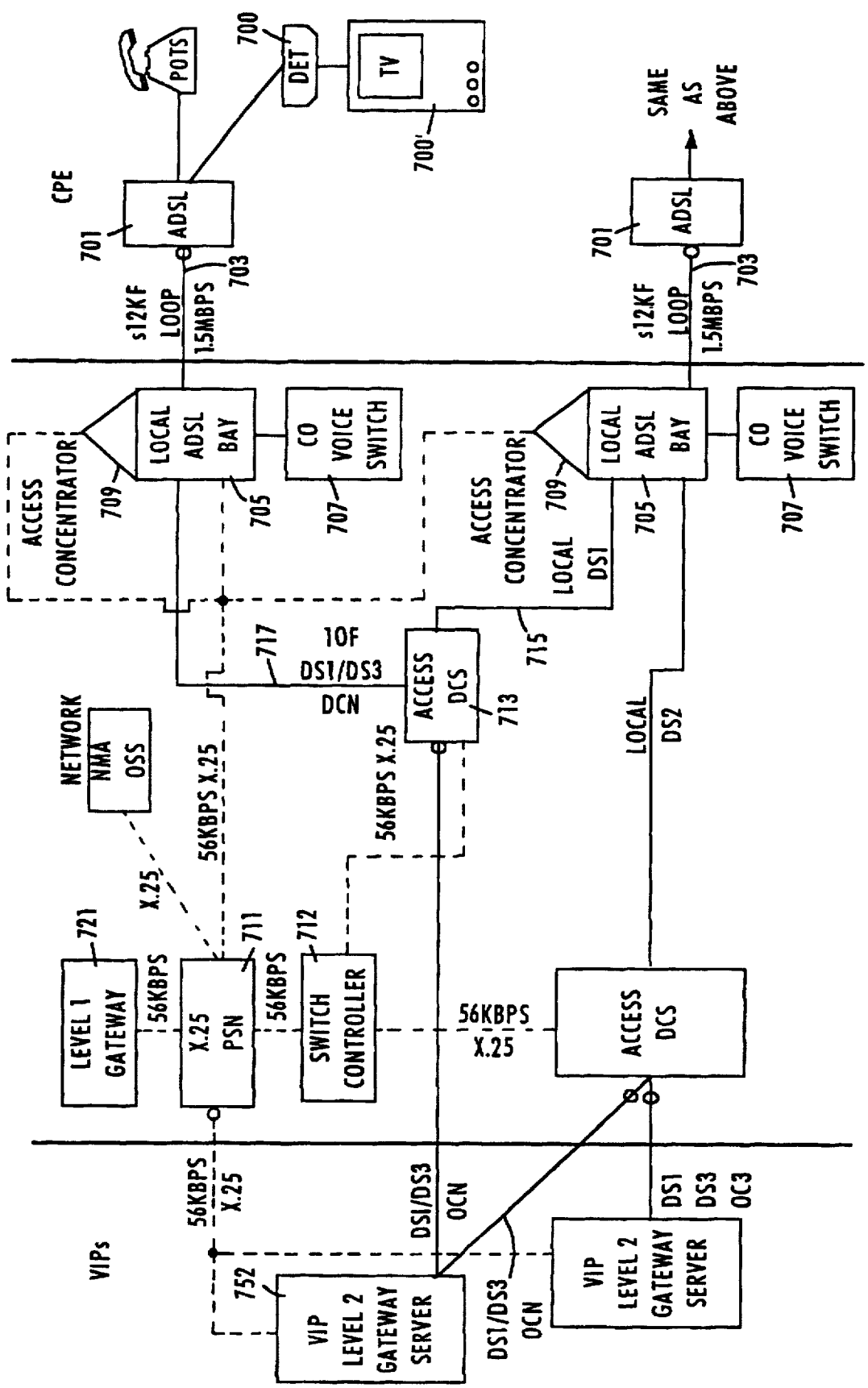
FIG. 7 illustrates a prior art configuration of a video dial tone network.

The first illustrated implementation is substantially the same as described previously with respect to FIG. 7. DET 700 connects to a subscriber-side ADSL multiplexer/demultiplexer interface unit 701 similar to the ADSL unit in the Litteral et al patent. ADSL twisted copper pair line 703 connects to a CO-side ADSL interface unit associated with the subscriber's local telephone company central office 17. Although not shown in the figure, the CO-side ADSL unit is preferably located in interface module 51 of FIG. 2. ADSL unit 701 provides transport for voice signals on the subscriber loop to and from standard telephone, a large downstream data channel from a Level 2 Gateway or other service provider and a bidirectional control channel over the ADSL line 703. One ADSL line to the home carries one channel of video programming and provides a single output channel. The output channel can provide a video signal to a VCR or to the TV set 700'.

In addition to switches and buttons contained directly thereon, DET 700 may also be responsive to infrared signals from remote control unit 702 to make selections and control inputs and outputs to the DET. The implementation may also include a general purpose personal computer 704 connected to DET 700 through a standard RS-232 or PCMCIA interface for the transfer of either video signals or control signals. Personal computer 704 may also connect directly to ADSL unit 701 in order to conduct broadband digital communications.

The second illustrated implementation utilizes an advanced fiber to the curb system with ATM (Asynchronous Transport Mode) transport, similar to one of the networks disclosed in commonly assigned application Ser. No. 08/250,792, filed May 27, 1994, entitled "Full Service Network" (attorney docket no. 680-080), the entire disclosure of which is incorporated herein by reference.

This implementation provides video services to subscribers through optical fiber connections rather than a twisted copper pair. A single drop may be used between the ONU 210 and the subscriber premises to carry voice, signaling and broadband information, and only a single connection is illustrated for simplicity. A coaxial cable carries the downstream broadband information and the two-way signaling information between the ONU 210 and the DET's 217 and television 217' (only one shown) on the subscriber premises. A separate twisted wire pair can be used to carry telephone service signals (POTS or ISDN) between the ONU and the telephone station(s) D at the subscriber premises. HDT 180 and ONU 210 effectively function as an optical type subscriber loop carrier system in the second implementation. The SSP processes outgoing telephone calls from telephone type equipment, such as station D, as well as incoming calls directed to that equipment in essentially the same manner as for calls to lines having only POTS type service to standard telephone stations.

In each implementation, the DET may contain the necessary software for displaying graphical user interfaces on an associated television screen, receiving input selections in conjunction with the graphical user interfaces, dialing up the telephone network, interacting with the ISCP and downloading the input selections to change the ISCP. Alternatively, the software and graphical interfaces may be stored in an intelligent peripheral (IP), which is associated with a SSP and separate from the DET, and the DET communicates with the IP to interact with the ISCP and make selections to the telephone service. The software and graphical interfaces may also be stored in a video information provider (VIP) offering a dial-up video-on-demand service.

Figure 4B:
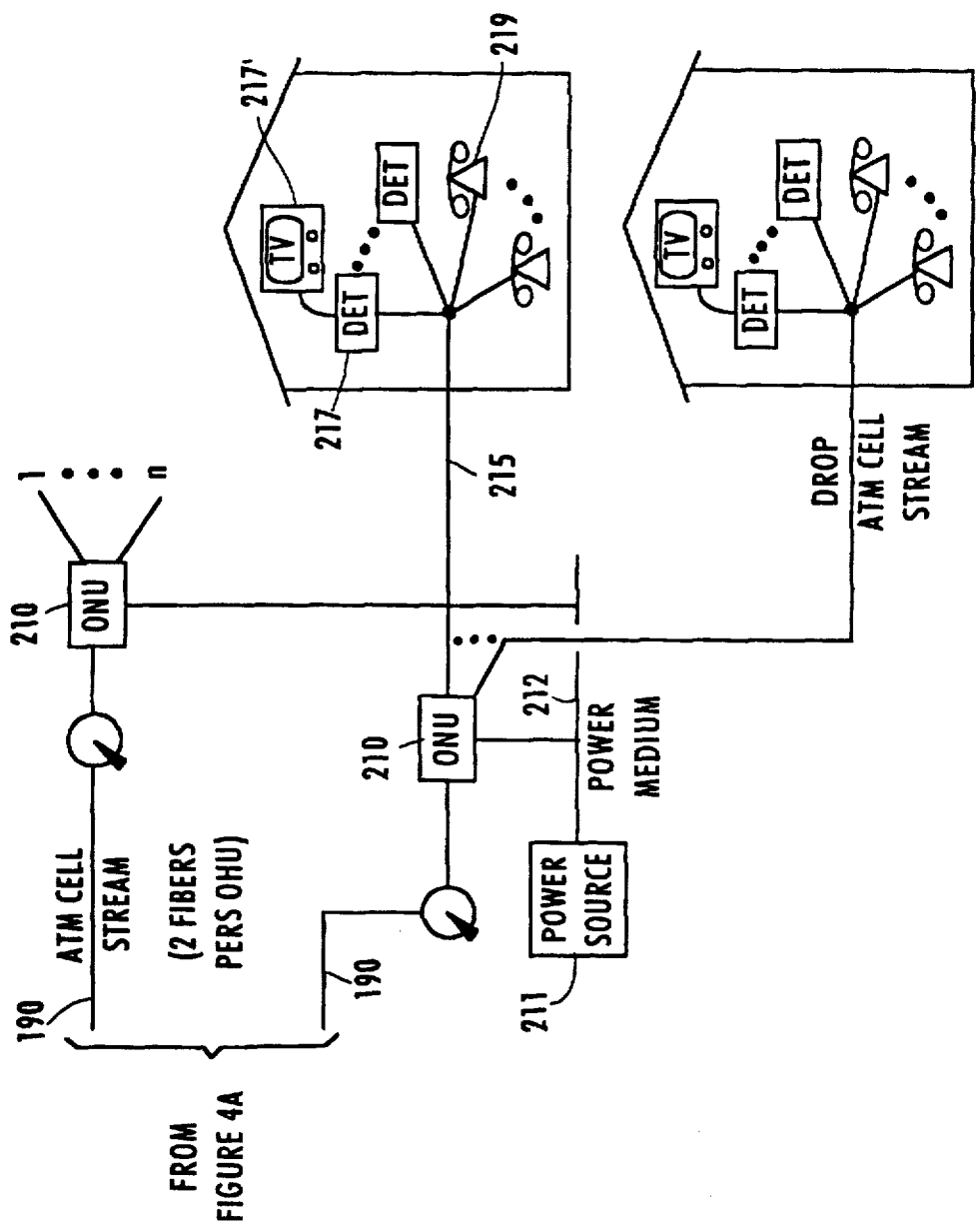
FIG. 4 shows in more detail an exemplary advanced intelligent network connected to several components of the system of FIG. 3, to form a network in accord with the present invention.

Each one of HDT 180 and ADSL 701 conduct signaling communications with an intelligent peripheral (IP) 37, shown with other components discussed in more detail in FIG. 4, to provide subscriber requested broadband services through DET 217 and DET 700, respectively. IP 37 cooperates with the ISCP to perform functions similar to those of one or more of the gateway devices in the prior art network of FIG. 7. In FIG. 4, the broadband components are shown in association with only one SSP and one IP, for simplicity only. In a network servicing a large number of broadband subscribers, there would be additional broadband components associated with other TELCO switching offices, and based on traffic demands, other subscribers would be serviced through other IP's.

As illustrated in FIG. 4, data services may be initiated from a CATV company 101, having an actual analog video source 110. Although only one is shown, a typical CATV company will have a plurality of such sources. The analog signal from the source is carried by any convenient means, such as coaxial cable, optical fiber, etc. Means (not shown) are provided as necessary to convert analog video transmission signals, e.g. NTSC broadcast signals, to baseband video and audio signals. The baseband signals are applied to a real time encoder 120.

The real time encoder 120 digitizes the audio and video signals and performs data compression. As currently envisaged, the encoder will encode the program signal into an MPEG 2 format although other digital compression encoding schemes may be used, such as DIGICIPHER™. MPEG (moving picture experts group) is a broad generic standard for video program compression, and MPEG 2 is a second generation compression standard for packetized transport of one or more compressed video program signals in a single stream. A number of specific compression algorithms will satisfy MPEG requirements. Typically, MPEG permits encoding of audio/video program materials into digitized, compressed format at rates in the range of 1.5 to 6 Mbits/sec.

The illustrated real time encoder 120 preferably is set up as a bank of encoders to process six sets of analog audio/ video program signals in parallel. As such, the bank of encoders 120 produces six 6 Mbits/sec MPEG 2 bit streams, which are combined together with appropriate overhead information into a single 45 Mbits/sec DS-3 type signal. The DS-3 signal from the encoder 120 is input to an interworking unit (IWU) 130. The interworking unit 130 is the actual input point for the encoded broadcast video information into the network.

The exemplary network illustrated in FIG. 4 utilizes asynchronous transfer mode (ATM) switching to transport all video information, including the broadcast video information. ATM is a packet oriented time division multiplexing technique. In ATM, information is organized into cells having a fixed length and format. Each cell includes a header, primarily for identifying cells relating to the same virtual connection, and an information field or "payload". In one proposal, a 53 octet ATM cell would include a cell header consisting of 5 octets and a payload consisting of 48 octets of data. The ATM cell header information includes a virtual circuit identifier/virtual path identifier (VCI/VPI) to identify the particular communication each cell relates to. For example, for broadcast signals, the VCI/VPI will identify a particular program channel. For a point to point transmission, e.g. for video on demand, the VCI/VPI in each header of the ATM cells would effectively identify a specific end point of the virtual communication link.

ATM transfer is asynchronous in the sense that the recurrence of cells that contain information from any particular sender is not necessarily periodic. Each device using the ATM network submits a cell for transfer when they have a cell to send, not when they have an assigned or available transmission time slot. ATM allows any arbitrary information transfer rate up to the maximum supported by the ATM network, simply by transmitting cells more often as more bandwidth is needed. In an initial implementation, all video materials will be transferred at a constant, standardized bit rate, however, preferred later generations of the network will utilize the ATM capabilities of the network to permit transmission of video information over channels of different bit rates, e.g. 1.5 Mbits/sec, 3 Mbits/sec, 6 Mbits/sec, etc. It will also be possible to vary the bit rate during communication on an as needed basis.

The interworking unit (IWU) 130 grooms the continuous MPEG 2 bit streams of the broadcast services for ATM cell stream transmission over optical fiber transport links. For example, the interworking unit will divide the bit stream into appropriate length payloads and combine the payload data with appropriate cell headers, necessary for ATM transport. In an initial implementation, downstream links would carry an OC-12 bit rate, but higher rate transports such as OC-48 will be used in later implementations. Assuming use of OC-12, one such transport link will normally carry the equivalent of 12 DS-3's. However, conversion into ATM cell format with associated headers imposes added overhead requirements on the data transmissions. In the presently preferred embodiment, one interworking unit 130 therefore processes up to ten DS-3 signals to produce an ATM bit stream at the OC-12 rate.

A transport interface 140 converts the electrical signal from the interworking unit 130 into an optical signal and transmits the optical signal through fiber 150 to an adaptive digital multiplexer (ADM) identified in the drawing as a video bridging and insertion device 160. The ADM 160 performs three functions, passive bridging, active bridging and insertion of signals from other broadcast service providers (if any). The three functions may actually be separate, but in the preferred embodiment would be performed by elements collocated within the one network component ADM 160.

As noted above, the real time encoders 120 each output a single DS-3 signal comprising up to 6 MPEG 2 bit streams. The interworking unit 130 processes up to ten DS-3 signals to produce an ATM bit stream at the OC-12 rate. Consequently, one broadcast video source 101 may produce as many as 60 channels of CATV type broadcast programming for transport over one OC-12 type SONET optical fiber 150. Many providers, however, may not choose to broadcast so many channels. For example, the provider operating broadcast video source 100 may offer only 42 channels. Such an ATM channel transmission on the optical fiber 150 will not utilize the entire OC-12 channel capacity of that fiber. In the specific example, the 42 channels together require the equivalent of 7 of the available 10 DS-3's.

The illustrated architecture permits a second service provider to utilize the transport capacity not used by the CATV company. The second service provider would offer additional channels from a separate second source 101'. The server 101' may be essentially identical in structure and operation to the source server 101, but the source/server 101' will offer up to the number of channels necessary to fill the OC-12 transport capacity. In the example, if the source 101 transmits 42 channels (7 DS-3's) via the fiber 150, the second source 101' could transmit up to 18 additional channels (3 DS3's). The function of the insertion device in the ADM 160 is to combine the signals from the two sources into a single OC-12 rate signal (10 DS-3's in ATM cell format) for further transmission through the optical network.

The two bridging functions facilitate dissemination of the broadcast material throughout the entire network. The passive bridging elements are optical splitters for splitting one OC-12 optical signal from the insertion device into a number of duplicates thereof, e.g. 1:2, 1:4, 1:8, etc. The active bridging elements convert an optical signal to an electrical signal, regenerate the electrical signal and convert the regenerated signal back to an optical signal for application to multiple output ports. The optical OC-12 output signals from the bridging components are transmitted over a large number of optical fibers 170 to host digital terminals throughout the network service area. The host data terminal (HDT) 180 is shown as a representative example.

When a subscriber requests a specific broadcast channel, the digital entertainment terminal (DET) in the subscriber's home provides a signal identifying the selected channel to the HDT 180. The signaling between the digital entertainment terminal (DET) and the HDT 180 and the real time control of the routing by the HDT 180 will be discussed in more detail below. Inside the HDT, the ATM cell stream from an optical fiber 170 is applied to a bus. To carry larger numbers of channels, there would be duplicate sources, insertion devices and bridging elements to transport the additional channels over fibers parallel to the illustrated fibers 170. Signals from one or more such additional parallel fibers would be applied to corresponding parallel buses inside HDT 180.

One HDT will communicate with a large number of optical network unit (ONU's) via pairs of optical fibers 190. As currently envisaged, each home or living unit will have as many as four DET's. Each ONU 210 and the downstream fiber of the pair 190 to the ONU 210 will provide downstream video services to a number of homes, e.g. 8 to 24. The transmissions on the downstream fibers between the HDT and the ONU's 210 are synchronous, although the video information remains in ATM cell format. Each DET served by an ONU 210 is assigned a specified time slot on the downstream fiber of a pair 190.

The HDT 180 includes a component which is essentially a non-blocking type ATM switch. In response to the selection signal from a DET, the HDT 180 accesses the appropriate bus and identifies each ATM cell on that bus for which the header information indicates that the cell represents information for the selected broadcast channel. The identified ATM cells are bridged by the ATM switch from the bus to a line card providing transmissions over the optical fiber 190 to the particular ONU 210 which services the requesting subscriber's premises. When the HDT selects each ATM cell for transmission to a specific DET, elements on the line card communicating with the particular ONU will buffer the cell as necessary and place the cell in the time slot for that DET on the downstream fiber of optical fiber pair 190. The cells selected for a particular DET, together with cells going to other DET's served by the same ONU multiplexed into their respective time slots, are applied to an electrical to optical converter and transmitted over the downstream fiber to the ONU 210 serving the particular subscriber's premises.

The basic purpose of the ONU 210 is to disaggregate the HDT side links into individual customer links and provide optical to electrical conversion for electrical delivery to the individual subscribers' premises. Although depicted as a single line in FIG. 4, in the current implementation, the drop cable to each subscriber's premises comprises a coaxial cable for carrying the video and/or digital data signals and a twisted wire pair for carrying telephone signaling. Alternatively, ADSL communications over twisted wire pair could be used between the ONU and the subscribers premises. In the preferred embodiment, the ONU 210 includes means to convert optical signals received over the downstream fiber of the pair 190 to electrical signals and transmit signals from each DET's assigned time slot down over the coaxial cable to the subscriber's premises. The ONU 210 also provides two-way conversion between optical and electrical signals for voice telephone service over the twisted wire pairs and for the signaling channels to/from the DETs.

DET 217 includes means to receive selection signals from a user and transmit appropriate data signals over a narrowband channel on the coaxial drop cable to the ONU 210. The ONU multiplexes the data signals from the DET's it services together and transmits those signals to the HDT over an upstream fiber of the optical fiber pair 190. The HDT 180 transmits the upstream control signals to the IP 37 which performs the function of a level 1 gateway and to provider service control elements referred to as level 2 gateways. In an initial implementation, the HDT's 180 communicate with the IP 37 and the gateways through an X.25 type data network 220. As noted above, the IP's also communicate with the ISCP 40 via a packet switched data communication network, such as X.25. The X.25 network 220 may carry this data traffic, or the communications between the ISCP 40 and the IP's may use a separate packet switched data network. Future implementations will use ATM communications to transport the signaling information.

A power source 211 supplies −130 V dc and battery reserve power for at least telephone service to the ONU's 210. The power source 211 may connect to the ONU's via twisted pairs, but power is preferably carried over a coax distribution cable.

Figure 5:
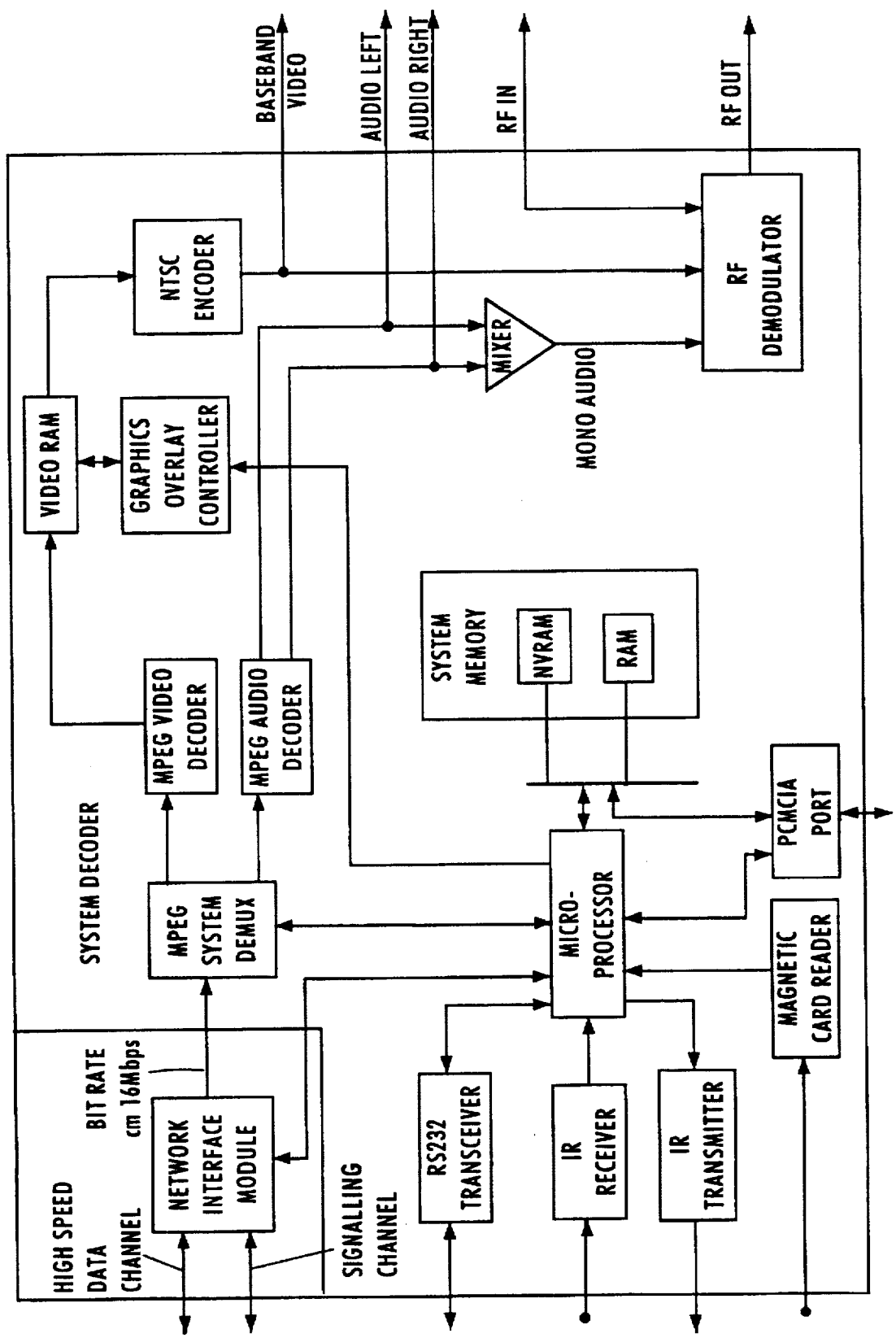
FIG. 5 is a schematic block diagram of an exemplary DET used in the preferred embodiment of the invention.

The DETs function similarly in each of the first and second implementations. The structure and operation of an exemplary DET is shown in FIG. 5 and described in detail in commonly assigned application Ser. No. 08/250,791, filed May 27, 1994, entitled "Dynamically Programmable Digital Entertainment Terminal" (attorney docket no. 680-083), the disclosure of which is entirely incorporated herein by reference.

A network interface module (NIM) can couple the set-top device or digital entertainment terminal (DET) 217 to either the twisted copper pair of the first implementation or the coaxial drop cable of the distribution network in the second implementation. The NIM includes appropriate means to select ATM cells from its assigned time slot on the coaxial cable and strip off the ATM header information and reconstitute the digital payload data, e.g. into MPEG packetized information. The NIM also provides two way signaling for transmission of narrowband data through the network, typically for control signaling purposes.

Each DET also includes a CPU comprising a 386 or 486 microprocessor with associated memory (RAM, ROM and EPROM), as well as an audio/video decoder controlled by the CPU. The audio/video decoder decompresses the digitized broadband information. The preferred embodiment of the audio/video decoder comprises an MPEG video decoder, an MPEG audio decoder, and an MPEG demultiplexer for selectively routing MPEG encoded video and audio packets carried on the digital broadband channel to the MPEG video decoder and the MPEG audio decoder, respectively. The MPEG demultiplexer routes data packets from the MPEG stream to the CPU for further processing, e.g. as downloaded data and/or control programming or as graphic/text information. Each DET also includes a graphics display generator for generating displays of received graphics and text data output by the CPU, such as the initial turn-on selection menu and provisioning menus, discussed in more detail below. Each DET also includes digital to analog converters and appropriate drivers to produce output signals compatible with a conventional television set from the decoded audio/video information and the graphics display.

Each DET also includes means to receive selection signals from a user, including an infrared receiver and an infrared transmitter, an RS-232 transceiver, a magnetic card reader and a PCMCIA port.

Different applications programs may be downloaded to the DET is a programmable device to which different applications programs from the IP or from an information provider's level 2 gateway device, in order to permit the DET to interact with different information service providers and thereby offer the user totally different types of services. At least one VIP, typically a vendor of the DET, also can download portions of the operating system. The DET will permanently store only an operating system and a loader program, to control initial communications with the HDT 180 or IAP 710 and the IP 37. Based on this loader routine, the DET will normally wake up in a CATV-like mode of operation for selecting and receiving broadcast programs, and the DET will offer the video information user (VIU) the option to select initiation of a call to an interactive service provider through the IP.

In addition to its various functions relating to telephone services discussed above, the IP 37 provides primary control of all routing and access functions of the broadband communications through the network and accumulates various usage statistics for broadband and interactive multimedia services. The control functions may include controlling access to broadcast programs by individual subscribers. Control of access to on-demand programming and interactive multimedia services through a PVC controller 420 and an ATM switch 410 will be discussed in more detail below. The IP 37 may also transmit narrowband information to each DET instructing it to initiate display of various selection menus of available video information service providers and messages relating to ongoing interactive call set-up processing.

The IP 37 maintains or has access to a data base of video information service providers and customer profile data for the broadcast, archival and interactive video services available through the network. This data may include customized menus, pre-subscription information, identification of impulse pay per view events and premium channels, etc. In the present invention, the video information providers and/or the individual customers can access this data at their location in order to provide for the provisioning of customized telephone services.

When the subscriber selects a specific broadcast channel, the DET transmits data upstream through the various network elements to the IP 37 identifying the selected channel. In response, the IP 37 accesses stored data regarding the broadcast services to which the customer currently subscribes. If the customer subscribes to the requested service, the IP transmits an instruction to the to route the cells for that channel to the subscriber's DET in the manner discussed above. If the customer is not currently a subscriber to that service, the IP 37 transmits a data message back to the DET instructing it to provide an appropriate display, e.g. informing the customer of a service denial and/or asking the subscriber for appropriate inputs to initiate a new subscription. As discussed in more detail below regarding point to point communications with interactive providers, the IP 37 can also execute a PIN number control function, in this case, however, to limit access to certain broadcast or telephone services.

The above selection procedure, with real-time control through IP 37, provides the gateway program or module within the IP with information as to each selection a subscriber makes and when the selection is made. The IP 37 also receives information as to when a DET session ends, e.g. upon turn-off of the DET or upon request for a session with a different provider or for receipt of a different broadcast channel. As such, the IP 37 has all information necessary to accumulate a variety of statistics as to viewer usage, both for billing purposes and for audience accounting purposes.

As an alternative to the real time control of broadcast program selection and access by the IP 37, certain relevant control data could be downloaded from the IP. With this modification, the broadcast VIP's would provide provisioning data to the IP, and the IP would periodically download that data to the appropriate HDT's through the X.25 signaling network 220.

The downloaded video provisioning data would include broadcast channel mapping information and subscriber authorization control information. The channel mapping information included in the video provisioning data is accessed in response to each program selection by a subscriber to route the corresponding ATM cell stream to the requesting DET. The channel mapping information specifies what programs are carried on each ATM virtual circuit, within each DS-3.

Although referred to as video provisioning data, the data may also relate to other wideband services, such as interactive multimedia services. Access to these additional broadband services is through an ATM switch 410, however the access through this switch is controlled by the IP 37 and the PVC controller 420. To establish a broadband communication session or connection through the network between an information service provider 400 and a particular DET requires establishment of a virtual circuit through the ATM switch 410. A PVC controller 420 stores data tables defining all possible virtual circuits through the ATM switch 410 to each terminal of a customer subscribing to a particular provider's services. These data tables define the ATM header information (VCI/VPI) and the particular fiber output needed to route cells correctly and the time slot information to each DET. The data tables thus define "permanent virtual circuits" (PVC's) between the providers and the DET's.

Each of the broadband service providers 400 will have a level 2 gateway 401 and some form of broadband file server 403. The provider's system may provide ATM cell stream outputs for transmission through the network. Alternatively, if the provider's equipment transmits only MPEG bit stream data, the network operator would supply an interworking unit (IWU) similar to the unit 130 discussed above, to convert the provider's bit stream data into an ATM cell stream format compatible with the illustrated network. The ATM switch transmits selected ATM cells via optical fibers 415 to the HDT's 180.

The authorization control data of the video provisioning data would indicate which program each subscriber is authorized to access, e.g. because that party has subscribed to the particular program service and is not delinquent in bill payments. When a subscriber requests a program, the data is checked to determine whether or not to supply the program to the subscriber's DET. As the selected channels are routed to the DET's, usage data is accumulated for the subscribers serviced thereby. The usage data is periodically uploaded to the IP 37 for subsequent transmission to appropriate billing systems of the network service provider. The IP 37 would be accessed for real-time signaling only under certain limited circumstances, e.g. when data in the HDT indicates access to a selected broadcast service requires a PIN number procedure.

The ISCP 40 stores routing control information which the IP 37 accesses to control processing of interactive service calls. For example, the ISCP 40 will store data regarding VIP's and subscribers to identify those subscribers entitled to access each VIP. If this data is related to the particular VIP, the data would list all subscribers permitted access, e.g. those who subscribe to that VIP's services and who are current in their payment of bills. If the data is related to the particular subscriber, the data might indicate that a PIN number functionality is to be applied to access certain VIP's from that subscriber's DET's.

When a subscriber activates the DET to initiate an outgoing call to an interactive service provider, the DET first initiates signaling communications with the IP 37. In response, the IP 37 transmits back text and/or graphics data through the signaling channel instructing the DET to display a message through the TV to the subscriber. Typically, the displayed message is a menu of providers currently available to this subscriber. However, one or more selections displayed on the menu may relate to interactive session with programs run on the IP itself, as discussed in more detail later.

The VIP selection menu is created from information stored in the IP 37 as a function of which VIP's are currently available to the calling subscriber. In a wide area implementation of the network, having multiple ATM switches, some VIP's may connect to only one of the ATM switches. The available VIP's listed on the menu therefore would be those providing service through a particular ATM switch and associated HDT's to a group of subscribers including the calling subscriber. Alternatively, the IP 37 may store and present a customized list of providers that this subscriber prefers to have available for accessing on a regular basis. With the customized menu option, for example, if there are ten providers available through a particular ATM switch 410, and the customer has opted to see only three available providers on a regular basis, the IP recognizes the customer's DET and transmits a customized menu listing only those three to the customer's DET for display. Typically, the customized menu would include an option to receive and select from the full list of providers offering services through the portion of the network serving the calling subscriber.

The user typically reviews the menu displayed on the TV screen and selects one of the available VIP's. In response, the user's DET transmits a signal identifying the number of the selection from the menu upstream to the level 1 gateway application program or module within the IP 37. The level 1 gateway application program or module within the IP always knows what menu it sent to the particular DET. The IP 37 therefore uses the precise menu information and a table of VIP identifier codes to translate the selection input signal from the DET into an actual 4-digit VIP identification address for the level 2 gateway of the particular VIP that the person selected.

The IP 37 launches a query to the ISCP 40. The query message identifies the calling subscriber and the selected VIP (by level 2 gateway identifier). The ISCP 40 accesses its data tables to determine if the calling subscriber is currently allowed access to the selected VIP and whether or not a PIN number functionality should be applied to this particular call. The ISCP then formats an appropriate response message based on the information from the relevant data tables and transmits that response message back to the IP 37.

If the data tables in the ISCP 40 mandate a PIN number functionality for this broadband call, the IP 37 transmits a text or graphics message through the downstream signaling channel to the calling subscriber's DET. In response, the DET displays a prompting message on the TV asking the current user to input an authorization code. The DET receives input digits from the user and transmits those digits upstream through the network to the IP 37. If the instruction from the ISCP 40 included the correct value of the PIN number, the IP compares the received digits to the correct value of the PIN number to determine validity of the code input by the current user of the DET. If the ISCP stores the PIN number(s) and did not relay the correct value to the IP, the IP responds to the digit input from the user by launching another message to the ISCP 40. This second message contains the input digits, and the ISCP 40 compares the entered digits to valid PIN number(s) stored in its data tables.

If no PIN number was required or the subscriber has entered a PIN and the ISCP or the IP has determined that the user input a valid PIN number, then the IP 37 instructs the PVC controller 420 to establish a broadband virtual circuit between a port of the server of the selected provider 400 and the subscriber's DET. The PVC controller 420 accesses its data tables to identify an available permanent virtual circuit between the server and the subscriber's DET for which all necessary elements are currently available. When an available circuit is identified, the PVC controller 420 provides appropriate instructions to the ATM switch 410 to "lock-up" that circuit as a currently active virtual circuit providing broadband communications from the server 403 of the provider 400 to the subscriber's DET. Concurrently, a similar procedure is used to establish a two-way active virtual circuit between the DET and the provider's level 2 gateway 401, via the X.25 network 220, to carry two-way control signalling messages. In the future, the signalling link will also take the form of ATM cell streams, and the ATM switch 410 will route that information to and from the appropriate provider 400.

Once the communication session is set up, the DET 217 can transmit control signalling upstream. For downstream transmission, the server 403 will provide ATM cells with an appropriate header. The ATM switch 410 will route the cells using the header and transmit those cells over fiber 415 to the requesting subscriber.

In the implementation of FIGS. 3 and 4, if one VIP offers a number of different broadband services, e.g. video on demand, home banking, home shopping, the IP may respond to a selection of that VIP by a calling subscriber by supplying the caller with a second menu listing those services. The IP would control the network to set up the signaling communications and broadband communications for an interactive session after the subscriber selected a particular service. If the VIP provides such services via a single level 2 gateway, the IP would identify the selected service to the VIP's level 2 gateway. Alternatively, if the VIP offered multiple services, the IP would route the interactive call to the corresponding level 2 gateway and server. These routing choices would be controlled by data tables stored in the IP or in the ISCP.

As part of the broadband call set up through the ATM switch 410, the PVC controller 420 transmits back a confirmation that the broadband connection has been established successfully back to the IP 37. At that point in the call processing routine, the level 1 gateway application program or module within the IP 37 initiates a billing record for the call. As noted above, an interactive broadband session then ensues via the broadband and signaling links. The IP 37 will also receive a notice of an end of a broadband session, e.g. from the level 2 gateway when that gateway and the DET signal each other to terminate communications. At that time, the level 1 gateway application program or module within the IP terminates the usage data record for the call.

The provisioning of customized telephone service using a pay-per-view (PPV) or video-on-demand (VOD) service in the network illustrated in FIG. 4 is carried out using the DET using a second set of menus which may be similar to those used for the provisioning of the video service itself. The end office SSP switch 17 provides narrowband transport for voice and narrowband data services for standard type plain old telephone service (POTS). A digital POTS type switch 17 provides a DS-1 type digital input/output port through interfaces conforming to either TR008 or TR303. Alternatively, the output may go to a digital cross-connect switch (not shown) for routing to the ADSL interface unit 701, various HDT's or directly to a multiplexer (MUX) 325 serving a particular HDT 180.

The MUX 325 serves to multiplex a number of DS-1 signals for transmission over one fiber of an optical fiber pair 335 to the HDT 180 and to demultiplex signals received over the other fiber of the pair 335. The fiber pairs between the HDT 180 and the ONU's 210 will also have a number of DS-1 channels to carry telephone and narrowband data signals to and from the subscriber's premises. The subscribers' drops 215 include both a coaxial cable and one or more twisted wire pairs. In addition to the video services discussed above, the ONU will provide telephone signals and appropriate power to the subscribers' premises over the twisted wire pairs connected to subscribers' telephone sets 219. Calls going to and from telephone stations shown in FIG. 4 are processed by the SSP's, IP and ISCP in precisely the manner discussed above with regard to FIG. 3.

When the subscriber turns on the DET 700, a loader routine and/or operating system within the DET will control wake up, and the DET will transmit an initial message intended for the level 1 gateway. In response to the initial message, the level 1 gateway transmits ASCII text representing one or more pages of a VIP selection menu back to the DET 700 through the assigned virtual circuit through the X.25 network 220 and the signaling channel on the subscriber's line 703. Upon receipt of the menu data, the DET 700 displays initial selection menu(s) on the subscriber's television set 700'.

The subscriber reviews the menu on their television set, and then inputs a selection using the infrared remote control device, either by moving a cursor to an appropriate point on the screen and hitting <ENTER> or by inputting digits followed by <ENTER>. In response to the selection input, the DET 700 will transmit an appropriate data signal upstream through the network to the level 1 gateway. One of the available selections on the initial selection menu(s) will be for the provisioning of customized telephone services. If selected, a second set of menus will appear for making further selections of the telephone services desired.

If the subscriber responds to the offer, a series of queries can be made to the subscriber to determine the desired services. For example: "Would you like calls to be interrupted during the movie?" Upon indicating yes or no using the set top box, a subsequent query can then be made such as "Would you like the ringer to be disabled?", etc. The selectable options are not limited, and may include any number or combination of known conventional telephone services such as call forwarding, Caller ID and call blocking. Call blocking may mean either disabling the ringer or failing to make a connection to complete the call. Full call blocking is the blocking of all phone calls and partial call blocking is the blocking of all calls from someone other than a small number of selected persons.

This provisioning of customized telephone services does not create telephone services. It merely allows a subscriber to select from existing telephone services or to change information in a template of their service such as the phone number which calls are forwarded to or the time at which calls are forwarded. The subscriber interacts and makes selections using the set top box and related input and output devices such as hard switches, remote control and magnetic card readers. The interactions and selections for the second set of menus are overlaid in a manner similar to that described previously for VIP selection menu(s). The set top box or other system in the network providing the interfaces and menus receives the selections, interacts with the ISCP and the STP, and downloads the information to set up or change the services as selected.

In the embodiment of FIGS. 3 and 4, either the DET, VIP or IP may provide the second set of menus for customizing telephone services. The set top box either directly provides graphical interfaces and menus at the subscriber premises for provisioning customized telephone services or it communicates with another system in the network through a Level 1 Gateway which in turn provides graphical interfaces and menus to the subscriber through the set top box. An example of such graphical interfaces and screen displays are shown in the figures (especially FIGS. 33 and 52 to 62) of the Babson et al patent discussed in the Background of the Related Art. However, the look and feel of the graphical interfaces and menus may be more sophisticated and may be changed more easily for a large number of subscribers if they reside outside the DET. As explained in more detail with respect to FIG. 6 below, the user interface may include a video or multimedia presentation which explains the advantages of the customized telephone services to the subscriber.

The service is modified by inputting data to populate the subscriber's data table(s) by transferring input control data to the ISCP for storage. If the particular service requires a stored voice message, such as a personalized greeting, that message must be stored in another system such as an intelligent peripheral. In a dial-up connection from the DET, the call is routed through the network to a line connected to the IP. The IP would provide for the transmission of a prompting menu to the DET and would accept DTMF inputs, in response to the prompting menu, to allow the subscriber to enter the service data, such as a new forwarding number or a new PIN number. The subscriber might also be prompted to record a greeting, if appropriate.

The IP would then query the ISCP, and the ISCP would return an instruction for each operation to be performed by the IP. For example, the IP would send a query, the ISCP would instruct the IP to play a specified prompt message and collect digits, e.g. for a new PIN number. The IP would play the message, collect the digits and return the digits to the ISCP. If further input was necessary, the ISCP would return another message requesting input of additional information, e.g. to confirm the input PIN number. This routine would continue until processing by the IP was complete.

Using the more generic form of communications with the ISCP, the ISCP might initiate the communications and larger quantities of data can be exchanged with each message. This capability might be used to instruct the IP or other system to play a specific detailed script type application, e.g. for input of a long series of data inputs and/or associated personalized messages to set up and more complex service. Assume for example, that the script called for an Interactive Voice Response (IVR) routine to input one or PIN numbers, an initial greeting for use as a prompt to request PIN number input and a second message for playback when a caller fails to input the correct PIN. The IP or other system would store a script for conducting a customized interactive input procedure for each particular subscriber, in the example for prompting and receiving the PIN digits and messages. When the DET dials up to change the telephone services, the call is routed through the network in the usual manner. Concurrently, the ISCP sends an initial message informing the appropriate network system of the incoming call and the need to retrieve the data necessary to play the particular service modification script. The system could then provide customized prompts and accept DTMF inputs to execute an authorization procedure and then allow the authorized subscriber to selectively enter one or more new PIN numbers, and store new voice messages. The network system might also provide confirmation messages repeating back the received data and requesting dialing of a confirmation code, such as depression of the '#' key.

Through either of the above discussed interactive procedures, all necessary information can be collected from the subscriber, after which the DET disconnects. The data will be transfered, as necessary, to the ISCP, for example the newly input PIN number through a signalling network. The ISCP will verify received data inputs from the subscriber to insure that they meet the requirements for controlling the particular subscriber's call processing routine, and if the inputs are valid, the ISCP stores the received data in the subscriber's files. If errors are found, for example if the caller entered only seven digits at a point where eight were expected, the ISCP could provide an error message, and the system would prompt again for input of the relevant data.

Use of the IP may also offer several alternatives for receiving subscriber inputs and transferring input data for storage in the SCP database 43. Different subscribers may access the system using different DET's, and/or one subscriber may access the database using different inputs at different times. For example, instead of using dialed digit inputs, speech recognition software in the DET might permit the caller to speak in input data, such as numbers for call redirection. The IP might also be programmed to send and receive data through the telephone network, and thereby permit subscriber's to access the system from a screen based telephone and/or a modem and personal computer arrangement.

The VIP, Level 2 Gateway, or IP may be dedicated solely to provisioning customized telephone services or may offer the provisioning of customized telephone services in addition to other services such as PPV or VOD. For example, the other system may be a SSP cable TV system having the equivalent of a Level 2 Gateway which head ends on HDT service in the CO for Lone Star and AVIS. The graphical interfaces, displays, menus, video and/or multimedia presentations for provisioning customized telephone services may be included in the Level 2 Gateway for the cable TV system along with software used for providing CATV type channel selection and functionality to the set top box.

Alternatively, an IP may be used for provisioning and modifying customized telephone services and/or controlling a VIP providing supporting video or multimedia programming. The IP provides prompts and receives DTMF or speech inputs from subscribers and stores service control data and personalized messages, for subsequent use in providing the subscribers' individualized services and a level ½ gateway for controlling the services of a related VIP. When a subscriber selected a service from such a VIP, the level 1 gateway application in the module would establish a signaling communication session between the DET and the level 2 gateway application program in the module. The level 1 gateway application would concurrently control the network to establish a broadband communication session between the subscriber's DET and the broadband server 403' of the chosen VIP. The level 2 gateway application would then provide menus and accept selection inputs from the subscriber in the normal manner, but the level 2 gateway application would transmit control messages, e.g. through the X.25 signaling network 220, to the VIP's server 403'. The server 403' would respond to those control messages by providing selected broadband information for transmission through the network to the subscriber's DET in the normal manner.

The DTMF digit collection and voice announcement functions of the IP 37 can also provide telephone call access to control specific services offered by VIP's through their level 2 gateway and associated server. For example, a VIP could be assigned a telephone number for dial up access. One or more of the SSP's of the network would recognize dialing of that number through a telephone station as a dialed destination number type AIN trigger. An SSP detecting such a trigger would query the ISCP 40, in the normal manner, and the ISCP 40 would instruct the SSP to route the call to the IP 37. Alternatively, the dialing of the number could trigger direct routing of the call to the IP as in FIG. 7.

The IP 37 would next obtain instructions from the ISCP 40 as to how to process the call. For example, the ISCP 40 could identify the called VIP based on the dialed destination number and instruct the IP 37 to play the VIP's customized initial greeting from storage within the IP and then collect digits. The greeting would welcome the caller to the VIP's services and provide a spoken initial menu of the services offered by the VIP. The IP would then collect digits indicating a selection from the menu and forward those digits to the ISCP for further analysis. If the selected service required a PIN, the ISCP would instruct the IP to prompt for the PIN and collect dialed digits for further processing by the ISCP.

Once the subscriber has selected a service and provided a valid PIN, if necessary, the IP 37 would establish a signaling call with the VIP's level 2 gateway. The level 2 gateway would instruct the IP to play appropriate prompt messages, collect dialed input digits and forward those digits through the signaling call back to the level 2 gateway to effectuate the necessary interactivity for the service selected by the calling subscriber. After successful ordering of a video event and customized telephone services, the level 2 gateway would inform the IP of the scheduling of the event and instruct the IP to authorize the subscriber's DET to receive and decode the event at the scheduled time. The IP would then signal the subscriber's DET at the appropriate time, to at least notify the user, and instruct the DET and other elements in the network to process calls in accordance with the requested customized telephone services.

As another example, the subscriber could request a customized telephone service which includes unique services offered by an IP which are not available from the DET, the VIP or the telephone company. For example, an IP may offer a unique voice messaging service which the customer may wish to employ during the duration of an ordered video event. The customer could request that calls be routed to said IP during the duration of the video event. After termination of the event, the IP could be accessed to retrieve messages or could download messages to the subscriber's DET 217.

The customized telephone service of the invention may be offered as an optional part of a pay-per-view or video-on-demand service so that when the subscriber makes a PPV or VOD selection, the VIP transmits a screen to the subscriber offering the subscriber a choice of telephone services such as call blocking and caller ID for the duration of the video event.

Additional services can be offered to the subscriber in conjunction with the video service. For example, the service may contain a trigger so that when the subscriber picks up the phone during a video program, the program is automatically paused for the duration of the call. The event may then automatically resume from the point of the pause or back up a small predetermined length of time such as a minute when the call is terminated or may resume manually by selecting an appropriate switch on the set top box.

Similarly, the PPV or VOD service may have all the functionality of a VCR, fast forward, rewind, etc., with the added capability of sending a marker to the video server indicating the time at which a telephone call was completed or terminated. For MPEG encoded video data, a time stamp is used to indicate a group of frames which relate to a certain time in the movie. That time stamp is stored at either the video server or the set top box or both depending on what system is used for pause, rewind and fast forward. When the call is terminated, the stored time stamp can then be used to immediately return to the point at which the movie was paused, to provide an indication of when a portion of the movie starting at the marker will next be available over the network, or to reorder a portion of the movie starting at the marker at another time.

The video service may also offer automatic or selective call back of the phone numbers, either with or without automatic ring-back, after the video service has ended. With automatic ring back, a call is initiated using the SS#7 network and indications are made on the screen when the number is busy and when the called party has picked up. This is done by sending a packet message up through the system over the X.25 packet link to the ISCP.

Figure 6B:
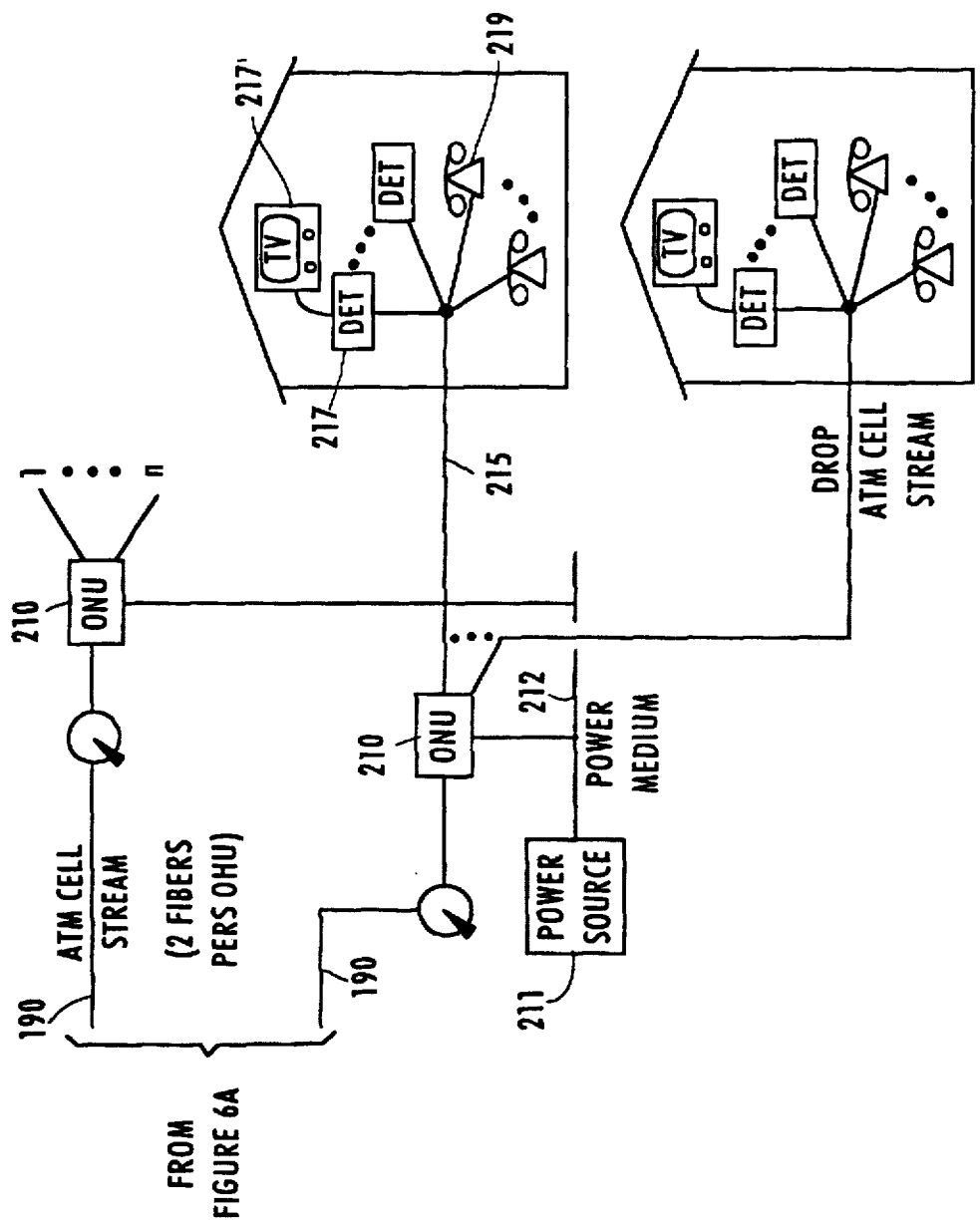
FIG. 6 illustrates a modified broadband network architecture, similar to that shown in FIG. 4, but with a broadband link to the intelligent peripheral.

FIG. 6 depicts a slightly modified version of the portion of the network illustrated in FIG. 4. In FIG. 6, the same reference numerals as in FIG. 4 identify elements having corresponding structure and function to elements shown in FIG. 4, respectively. The operation of this network is substantially identical to that of the earlier implementation of the network. As shown in FIG. 6, however, the IP 370 has a broadband output and includes a broadband server 1257. The server 1257 is similar to the interactive broadband file server 403 operated by one of the VIP's. The server 1257 outputs an ATM cell stream carrying digitized and compressed audio/video materials. The ATM cell stream output of the server 1257 goes to the ATM switch 410, and the network routes programs carried in that cell stream to individual subscribers DET's in essentially the same manner as for ATM broadband materials from the server 403.

The discussion of the IP control of broadband communications, with respect to FIG. 3, assumed only data/signaling communications between the IP 37 and the DET's. Consequently selection menus, etc., from the IP took the form of text and/or graphics. In the embodiment of FIG. 6, however, the IP 370 can transmit still frames of MPEG encoded video information and/or full motion video through the ATM cell stream and broadband routing through the network. This permits the operator of the IP to design much more varied interactive sessions combining text, graphics, still frames and full motion video for selections through the IP and for interactive sessions with the IP used to input or modify service related information stored in the network (e.g. for "Personal Options," "Service Activation" or "Subscription Management").

If the TELCO operating the network chose to offer video on demand or other broadband interactive services in direct competition with the VIP's, the broadband information for such services would be maintained within the broadband server 1257. In addition to level 1 gateway functions, the IP would also emulate a level 2 gateway. If the subscriber chose the TELCO's interactive service, the level 1 gateway application would establish a signaling communication session with the level 2 gateway application program in the module and would control the network to establish a broadband communication between the subscriber's DET 217 and the broadband server 1257. The level 2 gateway application would then provide menus and accept selection inputs from the subscriber and control the broadband server 1257 to provide selected broadband information for transmission through the network to the subscriber's DET 217, exactly as if the level 2 gateway and server were operated by an independent VIP.

For billing purposes, the IP 37 creates a billing record for each channel request which resulted in an actual broadband connection to a particular subscriber's DET and for each telephone call processed according to the requested customized telephone service. The IP 37 will create such records at least for the broadband connectivity through the ATM switch 410 to the interactive providers 400 and for pay per view type channel request and for telephone connectivity through SSP 17.

Each billing record identifies the VIP providing the particular service and the request resulting in the customized telephone service. For example, for one of the broadband interactive service providers, the record would identify that VIP's level 2 gateway, by a 4-digit code. The billing record includes an identification of the customer by billing telephone number, an identifier of the particular IP that serviced the call, the connect date, the time that the broadband connection was first established, and the elapsed time until tear-down of the broadband link. The IP supplies all of this information directly through a transmission link to the telephone company's carrier access billing system or 'CABS' (not shown) for processing into appropriate invoices for billing the VIP, in a manner substantially similar to billing of an Interexchange Carrier. The usage data can be downloaded periodically to the CABS, or the IP may initiate downloading in response to a manual request from the system administrator. The IP and CABS systems may also accumulate data and bill the VIP's for the X.25 signaling links between the DET's and the VIP's level 2 gateways, but in the currently preferred implementation there would not be any separate charges for the X.25 signaling communications.

The IP therefore collects usage statistics for billing purposes, and the CABS system generates bills for each VIP based on that network usage data. In the CABS type billing implementation, the subscriber may be charged a flat monthly charge, e.g. on her telephone bill, for video dial tone service, basic broadcast service, and customized telephone service. The usage sensitive charges for the broadband connections through the network, however, go to the VIP's; and the VIP's generate their own bills for the interactive services they provide to their customers.

As an alternative, the IP 37 can download the usage information to a customer record information system or 'CRIS' (not shown). CRIS would store information as to the charges and would process that information together with the usage data to generate a combined bill for the end user/subscriber. The subscriber would pay the billed amount to the network operations company, typically the local telephone company, and the network operations company would divide the received revenues between itself and the VIP(s).

Preferred embodiments will use combinations of both CABS type billing and CRIS type billing for different services offered by different providers through the integrated network. For example, one provider 400 offering only interactive type broadband services would be billed through CABS for the broadband connect time. For pay per view broadcast services offered by another provider, however, the IP 37 would download the relevant data to the CRIS system to generate a combined bill for connect time and pay per view event purchases.

Although several preferred embodiments of the invention have been described in detail above, it should be clear that the present invention is capable of numerous modifications as would be apparent to one of ordinary skill in the art. Such modifications fall within the purview of the appended claims.

We claim:

1. A network comprising:

a plurality of telephone switching systems;

an integrated service control point, separate from the plurality of telephone switching systems and storing call processing data associated with a plurality of local communication lines for control of call processing through one or more of the telephone switching systems;

an interface for making requests for customized telephone services for individual customers;

a telephone system for providing customized telephone services to customers in accordance with the requests for customized telephone services for individual customers;

a digital entertainment terminal for receiving digital video information transmitted from a video service provider system, providing a video output signal in response to said digital video information, accessing said integrated service control point and transmitting service control signals for requesting customized telephone services to said integrated service control point in response to user inputs; and a video display, connected to the digital entertainment terminal, for receiving said video output signal and providing a display in response to the video output signal, wherein at least some of the call processing data is modified in response to said service control signals so that at least one of said customized telephone services is performed only during the reception of said digital video information.

2. A network comprising:

a plurality of telephone switching systems;

an integrated service control point, separate from the plurality of telephone switching systems, wherein said integrated services control point comprises: a programmable database storing call processing data associated with a plurality of local communication lines for control of call processing through one or more of the telephone switching systems, a service management system, a data and reporting system for capturing and storing a data record of calls processed by accessing the database, and an internal data communication system interconnecting said programmable database, said service management system, and said data and reporting system;

an interface for making requests for customized telephone services for individual customers;

a telephone system for providing customized telephone services to customers in accordance with the requests for customized telephone services for individual customers;

a digital entertainment terminal for receiving digital video information transmitted from a video service provider system, providing a video output signal in response to said digital video information, accessing said integrated service control point and transmitting service control signals for requesting customized telephone services to said integrated service control point in response to user inputs; and a video display, connected to the digital entertainment terminal, for receiving said video output signal and providing a display in response to the video output signal, wherein at least some of the call processing data is modified in response to said service control signals.

3. A network as in claim 2, wherein said internal data communication system is a token ring data communication system.

4. A network comprising:

a plurality of telephone switching systems;

an integrated service control point, separate from the plurality of telephone switching systems and storing call processing data associated with a plurality of local communication lines for control of call processing through one or more of the telephone switching systems;

an interface for making requests for customized telephone services for individual customers;

a telephone system for providing customized telephone services to customers in accordance with the requests for customized telephone services for individual customers;

a digital entertainment terminal for receiving digital video information transmitted from a video service provider system, providing a video output signal in response to said digital video information, accessing said integrated service control point and transmitting service control signals for requesting customized telephone services to said integrated service control point in response to user inputs; and a video display, connected to the digital entertainment terminal, for receiving said video output signal and providing a display in response to the video output signal, wherein at least some of the call processing data is modified in response to said service control signals, and wherein digital video information is transmitted from said video provider system through an ATM switch to said digital entertainment terminal which receives said digital video information in the form of an ATM cell stream.

5. A network comprising:

a plurality of telephone switching systems;

an integrated service control point, separate from the plurality of telephone switching systems and storing call processing data associated with a plurality of local communication lines for control of call processing through one or more of the telephone switching systems;

an interface for making requests for customized telephone services for individual customers;

a telephone system for providing customized telephone services to customers in accordance with the requests for customized telephone services for individual customers;

a digital entertainment terminal for receiving digital video information transmitted from a video service provider system, providing a video output signal in response to said digital video information, accessing said integrated service control point and transmitting service control signals for requesting customized telephone services to said integrated service control point in response to user inputs; and a video display, connected to the digital entertainment terminal, for receiving said video output signal and providing a display in response to the video output signal, wherein at least some of the call processing data is modified in response to said service control signals, and wherein said digital entertainment terminal is provided at a location separated from and connected to one of said telephone switching systems by a twisted copper wire pair.

6. A network comprising:

a plurality of telephone switching systems;

an integrated service control point, separate from the plurality of telephone switching systems and storing call processing data associated with a plurality of local communication lines for control of call processing through one or more of the telephone switching systems;

an interface for making requests for customized telephone services for individual customers;

a telephone system for providing customized telephone services to customers in accordance with the requests for customized telephone services for individual customers;

a digital entertainment terminal for receiving digital video information transmitted from a video service provider system, providing a video output signal in response to said digital video information, accessing said integrated service control point and transmitting service control signals for requesting customized telephone services to said integrated service control point in response to user inputs; and a video display, connected to the digital entertainment terminal, for receiving said video output signal and providing a display in response to the video output signal, wherein at least some of the call processing data is modified in response to said service control signals, and wherein said network further comprises an intelligent peripheral connected to said integrated service control point.

7. A network as in claim 6, wherein said intelligent peripheral comprises means for processing voice messages and dual-tone multifrequency signals, at least one server for providing an auxiliary call processing capability, an interface to a signalling communication system, and an internal data communication system carrying information between said processing means, said at least one server and said interface.

8. A network comprising:

a plurality of telephone switching systems;

an integrated service control point, separate from the plurality of telephone switching systems and storing call processing data associated with a plurality of local communication lines for control of call processing through one or more of the telephone switching systems;

an interface for making requests for customized telephone services for individual customers;

a telephone system for providing customized telephone services to customers in accordance with the requests for customized telephone services for individual customers;

a digital entertainment terminal for receiving digital video information transmitted from a video service provider system, providing a video output signal in response to said digital video information, accessing said integrated service control point and transmitting service control signals for requesting customized telephone services to said integrated service control point in response to user inputs; and a video display, connected to the digital entertainment terminal, for receiving said video output signal and providing a display in response to the video output signal, wherein at least some of the call processing data is modified in response to said service control signals, wherein said telephone network further comprises a common channel interoffice signalling network.

9. A network as in claim 8, wherein said common channel interoffice signalling network comprises an X.25 signalling communication system.

10. A network as in claim 1, wherein said service control signals for requesting customized telephone services cause a modification of call processing data associated with a plurality of local communication lines.

11. A network as in claim 10, wherein said call processing data associated with a plurality of local communication lines is modified only in response to the input of a PIN number.

12. A network as in claim 11, wherein said customized telephone services include call blocking.

13. A network comprising:

a plurality of telephone switching systems;

an integrated service control point, separate from the plurality of telephone switching systems and storing call processing data associated with a plurality of local communication lines for control of call processing through one or more of the telephone switching systems;

an interface for making requests for customized telephone services for individual customers;

a telephone system for providing customized telephone services to customers in accordance with the requests for customized telephone services for individual customers;

a digital entertainment terminal for receiving digital video information transmitted from a video service provider system, providing a video output signal in response to said digital video information, accessing said integrated service control point and transmitting service control signals for requesting customized telephone services to said integrated service control point in response to user inputs; and a video display, connected to the digital entertainment terminal, for receiving said video output signal and providing a display in response to the video output signal, wherein at least some of the call processing data is modified in response to service control signals so that telephone calls are rerouted only during the reception of said digital video information.

14. A network as in claim 1, wherein said digital entertainment terminal transmits information representing graphical interfaces which prompt the user to make selections designating customized telephone services to said video display and transmits said service control signals in response to said user selections.

15. A network comprising:

a plurality of telephone switching systems;

an integrated service control point, separate from the plurality of telephone switching systems and storing call processing data associated with a plurality of local communication lines for control of call processing through one or more of the telephone switching systems;

an interface for making requests for customized telephone services for individual customers;

a telephone system for providing customized telephone services to customers in accordance with the requests for customized telephone services for individual customers;

a digital entertainment terminal for receiving digital video information transmitted from a video service provider system, providing a video output signal in response to said digital video information, accessing said integrated service control point and transmitting service control signals for requesting customized telephone services to said integrated service control point in response to user inputs; and a video display, connected to the digital entertainment terminal, for receiving said video output signal and providing a display in response to the video output signal, wherein at least some of the call processing data is modified in response to said service control signals, and wherein said video service provider provides a video-on-demand service wherein a video program is transmitted upon subscriber request and said customized telephone services include pausing said video program when a telephone call is received during said video-on-demand service.

16. A network as in claim 14, wherein said graphical interfaces comprise a series of menu screens and said video service provider transmits said graphical interfaces as digital video information.

17. A method of providing customized telephone services for individual customers in a network having a plurality of telephone switching systems, a services control point, separate from the plurality of telephone switching systems and storing call processing data associated with a plurality of local communication lines for control of call processing through one or more of the telephone switching systems, and an interface for making requests for customized telephone services for individual customers, the method comprising the steps of:

transmitting digital video information provided by a video service provider to a digital entertainment terminal;

receiving said transmitted digital video information from said video service provider system and providing a video output signal to a display in response to said transmitted digital video information;

receiving and displaying said video output signal on said display;

transmitting service control signals for requesting customized telephone services for individual customers upstream from the digital entertainment terminal in response to user inputs; and modifying call processing data for control of call processing through one or more of the telephone switching systems in response to said service control signals so that at least one of said customized telephone services is performed only during the reception of said digital video information.

18. A method of providing customized telephone services for individual customers in a network having a plurality of telephone switching systems, a services control point, separate from the plurality of telephone switching systems and storing call processing data associated with a plurality of local communication lines for control of call processing through one or more of the telephone switching systems, and an interface for making requests for customized telephone services for individual customers, the method comprising the steps of:

transmitting digital video information provided by a video service provider to a digital entertainment terminal;

receiving said transmitted digital video information from said video service provider system and providing a video output signal to a display in response to said transmitted digital video information;

receiving and displaying said video output signal on said display;

transmitting service control signals for requesting customized telephone services for individual customers upstream from the digital entertainment terminal in response to user inputs; and modifying call processing data for control of call processing through one or more of the telephone switching systems in response to said service control signals, wherein said integrated services control point further comprises a service management system, a data and reporting system for capturing and storing a data record of calls processed by accessing the database, a service creation environment terminal subsystem for programming the database, and an internal data communication system interconnecting said database, said service management system, said data and reporting system and said service creation environment.

19. A method as in claim 18, wherein said internal data communication system comprises a token ring data communication system.

20. A method as in claim 18, wherein the step of transmitting digital video information comprises transmitting said digital video information through an ATM switch and the step of receiving said transmitted digital video information comprises receiving said transmitted digital video information in the form of an ATM cell stream.

21. A method of providing customized telephone services for individual customers in a network having a plurality of telephone switching systems, a services control point, separate from the plurality of telephone switching systems and storing call processing data associated with a plurality of local communication lines for control of call processing through one or more of the telephone switching systems, and an interface for making requests for customized telephone services for individual customers, the method comprising the steps of:

transmitting digital video information provided by a video service provider to a digital entertainment terminal;

receiving said transmitted digital video information from said video service provider system and providing a video output signal to a display in response to said transmitted digital video information;

receiving and displaying said video output signal on said display;

transmitting service control signals for requesting customized telephone services for individual customers upstream from the digital entertainment terminal in response to user inputs; and modifying call processing data for control of call processing through one or more of the telephone switching systems in response to said service control signals, wherein the steps of transmitting digital video information and transmitting service control signals comprise transmitting said digital video information and said service control signals between separate locations connected, at least in part, by a twisted copper wire pair.

22. A method of providing customized telephone services for individual customers in a network having a plurality of telephone switching systems, a services control point, separate from the plurality of telephone switching systems and storing call processing data associated with a plurality of local communication lines for control of call processing through one or more of the telephone switching systems, and an interface for making requests for customized telephone services for individual customers, the method comprising the steps of:

transmitting digital video information provided by a video service provider to a digital entertainment terminal;

receiving said transmitted digital video information from said video service provider system and providing a video output signal to a display in response to said transmitted digital video information;

receiving and displaying said video output signal on said display;

transmitting service control signals for requesting customized telephone services for individual customers upstream from the digital entertainment terminal in response to user inputs; and modifying call processing data for control of call processing through one or more of the telephone switching systems in response to said service control signals, which comprises the further steps of transmitting voice messages from an intelligent peripheral and receiving dialed digit signals at said intelligent peripheral.

23. A method as in claim 22, which comprises the further steps of processing voice messages and dual-tone multifrequency signals in a processing means in said intelligent peripheral, providing an auxiliary call processing capability using at least one server, and carrying information on an internal data communication system between said processing means, said at least one server and an interface with a second signalling communication system.

24. A method of providing customized telephone services for individual customers in a network having a plurality of telephone switching systems, a services control point separate from the plurality of telephone switching systems and storing call processing data associated with a plurality of local communication lines for control of call processing through one or more of the telephone switching systems, and an interface for making requests for customized telephone services for individual customers, the method comprising the steps of:

transmitting digital video information provided by a video service provider to a digital entertainment terminal;

receiving said transmitted digital video information from said video service provider system and providing a video output signal to a display in response to said transmitted digital video information;

receiving and displaying said video output signal on said display;

transmitting service control signals for requesting customized telephone services for individual customers upstream from the digital entertainment terminal in response to user inputs; and modifying call processing data for control of call processing through one or more of the telephone switching systems in response to said service control signals, wherein said network further comprises a common channel interoffice signalling network.

25. A method as in claim 24, wherein said common channel interoffice signalling network comprises an X.25 signalling communication system.

26. A method as in claim 17, wherein said step of modifying call processing data associated with a plurality of local communication lines for control of call processing comprises modifying said call processing data so that said customized telephone services are performed only during the reception of said digital video information.

27. A method as in claim 26, wherein said call processing data associated with a plurality of local communication lines for control of call processing is modified only in response to the input of a PIN number.

28. A method as in claim 26, wherein said customized telephone services include call blocking.

29. A method of providing customized telephone services for individual customers in a network having a plurality of telephone switching systems, a services control point, separate from the plurality of telephone switching systems and storing call processing data associated with a plurality of local communication lines for control of call processing through one or more of the telephone switching systems, and an interface for making requests for customized telephone services for individual customers, the method comprising the steps of:

transmitting digital video information provided by a video service provider to a digital entertainment terminal;

receiving said transmitted digital video information from said video service provider system and providing a video output signal to a display in response to said transmitted digital video information;

receiving and displaying said video output signal on said display;

transmitting service control signals for requesting customized telephone services for individual customers upstream from the digital entertainment terminal in response to user inputs; and modifying call processing data for control of call processing through one or more of the telephone switching systems in response to said service control signals, wherein said step of modifying call processing data for control of call processing comprises modifying said call processing data so that at least one of said customized telephone services is performed only during the reception of said digital video information, wherein call processing data for control of call processing is modified so that telephone calls are rerouted.

30. A method as in claim 17, which comprises the further step of displaying graphical interfaces to prompt the user to make selections designating customized telephone services and wherein the step of transmitting said service control signals occurs in response to said user selections.

31. A method of providing customized telephone services for individual customers in a network having a plurality of telephone switching systems, a services control point, separate from the plurality of telephone switching systems and storing call processing data associated with a plurality of local communication lines for control of call processing through one or more of the telephone switching systems, and an interface for making requests for customized telephone services for individual customers, the method comprising the steps of:

transmitting digital video information provided by a video service provider to a digital entertainment terminal;

receiving said transmitted digital video information from said video service provider system and providing a video output signal to a display in response to said transmitted digital video information;

receiving and displaying said video output signal on said display;

transmitting service control signals for requesting customized telephone services for individual customers upstream from the digital entertainment terminal in response to user inputs; and modifying call processing data for control of call processing through one or more of the telephone switching systems in response to said service control signals, wherein said step of transmitting digital video information comprises a video-on-demand service wherein a video program is transmitted upon subscriber request and wherein said customized telephone services include pausing said video program when a telephone call is received during said video-on-demand service.

32. A method as in claim 30, wherein said graphical interfaces comprise a series of menu screens and said step of transmitting digital video information comprises transmitting said graphical interfaces.

* * * * *